US007248166B2

(12) United States Patent
Ono et al.

(10) Patent No.: US 7,248,166 B2
(45) Date of Patent: Jul. 24, 2007

(54) IMAGING DEVICE, INFORMATION STORAGE SERVER, ARTICLE IDENTIFICATION APPARATUS AND IMAGING SYSTEM

(75) Inventors: Shuji Ono, Kanagawa (JP); Ayumu Isomura, Tokyo (JP); Yasuhiro Shinkai, Tokyo (JP); Yoshihiro Maeda, Tokyo (JP); Kazuhiro Mino, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 290 days.

(21) Appl. No.: 10/951,626

(22) Filed: Sep. 29, 2004

(65) Prior Publication Data
US 2005/0104956 A1 May 19, 2005

(30) Foreign Application Priority Data

| Sep. 29, 2003 | (JP) | ............................. 2003-338706 |
| Sep. 29, 2003 | (JP) | ............................. 2003-338707 |
| Sep. 2, 2004 | (JP) | ............................. 2004-256341 |
| Sep. 9, 2004 | (JP) | ............................. 2004-262139 |

(51) Int. Cl.
*G08B 13/14* (2006.01)

(52) U.S. Cl. .............................. 340/572.1; 340/539.1; 340/521; 455/344

(58) Field of Classification Search ............. 340/572.1, 340/686.1, 539.1, 521, 522, 555; 455/344, 455/208.14, 208.16, 220.1; 348/154, 155; 235/375, 376

See application file for complete search history.

(56) References Cited

U.S. PATENT DOCUMENTS 6,512,478 B1 * 1/2003 Chien .................... 342/357.09

\* cited by examiner

*Primary Examiner*—Benjamin C. Lee
*Assistant Examiner*—Travis Hunnings
(74) *Attorney, Agent, or Firm*—Sughrue Mion, PLLC

(57) ABSTRACT

An imaging device for receiving a radio signal output from an RF tag attached to a subject to acquire identification information of the subject, includes: an imaging unit for continuously imaging a plurality of subjects to acquire a moving image; a radio receiver for receiving a plurality of radio signals respectively output from RF tags attached to the subjects to acquire a plurality of units of subject identification information respectively indicated by the radio signals, the subject identification information identifying a corresponding subject, the radio receiver moving together with the imaging unit and having directivity in a direction approximately the same as an imaging direction of the imaging unit; a moving amount calculation unit for calculating a moving amount of the radio receiver based on the acquired moving image; and a subject direction specifying unit for specifying directions of the subjects respectively identified by the plurality of units of subject identification information based on changes in field intensities of the radio signals, the changes corresponding to the moving amount of the radio receiver.

30 Claims, 18 Drawing Sheets

424

| ITEM IDENTIFICATION INFORMATION | ITEM INFORMATION | | |
|---|---|---|---|
| | ITEM IMAGE | SHOP PHONE NUMBER | SHOP MAP |
| A0001 | A001.jpg | 03-**-** | A0001_map.jpg |
| ⋮ | ⋮ | ⋮ | ⋮ |

| OWNER IDENTIFICATION INFORMATION | NUMBER OF POINTS |
|---|---|
| 0001 | ○○ POINTS |
| ⋮ | ⋮ |

*FIG. 7*

IMAGING DEVICE, INFORMATION STORAGE SERVER, ARTICLE IDENTIFICATION APPARATUS AND IMAGING SYSTEM

This patent application claims priority from Japanese Patent Applications Nos. 2004-256341 filed on Sep. 2, 2004, 2003-338707 filed on Sep. 29, 2003, 2004-262139 filed on Sep. 9, 2004 and 2003-338706 filed on Sep. 29, 2003, the contents of which are incorporated herein by reference.

BACKGROUND OF THE INVENTION

1. Field of the Invention

The present invention relates to an imaging device, an information storage server and an article identification apparatus. More particularly, the present invention relates to an imaging device for receiving a radio signal output from an RF (radio frequency) tag attached to a subject and acquiring identification information of the subject, an information storage server for storing information acquired from that imaging device, and an article identification information for acquiring information on an article by receiving a radio signal output from an RF tag attached to the article so as to identify the article.

The present invention also relates to an imaging device and an imaging system. More particularly, the present invention relates to an imaging device and an imaging system for restricting acquisition or use of an image containing a predetermined subject.

2. Description of the Related Art

In recent years, cellular phones with cameras have spread rapidly. Moreover, a cellular phone with a mega-pixel camera is put into practical use, and rapid improvement of image quality has continued to achieve image quality that is not inferior to that of a conventional digital camera. Thus, an environment is achieved in which many people always cellular phones with cameras and can take pictures anywhere at any time. The inventors of the present application found no publication disclosing the art related to the present invention. Therefore, description of such a publication is omitted.

When encountering an attractive item, a user of the cellular phone with the camera may take an image of that item there and look for information on that item by using the thus taken image. For example, in a case where the user wants to buy an item the same as clothes or a cap another person wears on the street, the user can take an image of that item by the cellular phone with the camera and find and buy that item by using that image. However, in some cases, the user cannot find that item only based on that image or it takes a long time to find that item. Thus, such an approach to finding that item is inconvenient.

Moreover, the fact many people can take pictures anywhere at any time means that everyone is placed in an environment in which everyone can be imaged anywhere at any time. Thus, protection of privacy becomes a hot topic with the spread of the cellular phone with the camera.

SUMMARY OF THE INVENTION

Therefore, it is an object of the present invention to provide an imaging device, an information storage server, an article identification apparatus and an imaging system, which are capable of overcoming the above drawbacks accompanying the conventional art. The above and other objects can be achieved by combinations described in the independent claims. The dependent claims define further advantageous and exemplary combinations of the present invention.

According to the first aspect of the present invention, an imaging device for receiving a radio signal output from an RF tag attached to a subject to acquire identification information of the subject, comprises: an imaging unit operable to continuously image a plurality of subjects to acquire a moving image; a radio receiver operable to receive a plurality of radio signals respectively output from RF tags attached to the plurality of subjects to acquire a plurality of units of subject identification information respectively indicated by the plurality of radio signals, the subject identification information being information for identifying a corresponding one of the subjects, the radio receiver moving together with the imaging unit and having directivity in a direction approximately the same as an imaging direction of the imaging unit; a moving amount calculation unit operable to calculate a moving amount of the radio receiver based on the moving image acquired by the imaging unit; and a subject direction specifying unit operable to specify directions of the plurality of subjects that are identified by the plurality of units of subject identification information acquired by the radio receiver based on changes in field intensities of the plurality of radio signals received by the radio receiver, respectively, the changes corresponding to the moving amount of the radio receiver calculated by the moving amount calculation unit.

The imaging device may further comprise: a selecting instruction acquisition unit operable to acquire a selecting instruction from a user while the imaging unit continuously images the plurality of subjects to acquire the moving image; a subject image extraction unit operable to extract a subject image that is an image when the selecting instruction acquisition unit acquired the selecting instruction, from the moving image; and an image storage unit operable to store subject identification information the radio receiver acquired from a direction of a subject contained in the extracted subject image to be associated with the extracted subject image.

The imaging device may further comprise: a subject image acquisition unit operable to, in a case where the radio receiver acquired two or more units of subject identification information from the direction of the subject contained in the extracted subject image, acquire subject images respectively identified by the two or more units of subject identification information from a server; and a subject image selection unit operable to select one of the two or more subject images acquired by the subject image acquisition unit, that is similar to the subject image extracted by the subject image extraction unit, wherein the image storage unit stores one unit of the two or more subject identification information received by the radio receiver, that identifies the subject image selected by the subject image selection unit, to be associated with the subject image extracted by the subject image extraction unit.

The imaging device may further comprise: a subject type acquisition unit operable to, in a case where the radio receiver acquired two or more units of subject identification information from the direction of the subject contained in the extracted subject image, acquire two or more subject types respectively identified by the two or more units of subject identification information from a server; and a subject type selection unit operable to specify a site in a human body as the subject contained in the subject image extracted by the subject image extraction unit and to select one of the two or more subject types the subject type acquisition unit acquired based on the specified site, wherein the image storage unit stores one of the two or more units of subject identification information the radio receiver acquired, that identifies the one subject type selected by the subject type selection unit, to be associated with the subject image extracted by the subject image extraction unit.

The imaging device may further comprise: a subject information acquisition unit operable to acquire subject information identified by the subject identification information that is stored by the image storage unit to be associated with the subject image, from a server; and a display unit operable to display the subject information acquired by the subject information acquisition unit.

In a case where the radio receiver acquired two or more units of subject identification information from the direction of the subject contained in the extracted subject image, the image storage unit may store the two or more units of subject identification information acquired by the radio receiver from the direction of the subject contained in the extracted subject image, to be associated with the subject image extracted by the subject image extraction unit, the subject information acquisition unit may acquire basic information from the server for each of two or more subjects respectively identified by the two or more units of subject identification information stored by the image storage unit, the basic information being simpler than the subject information, and the display unit may display two or more units of basic information acquired by the subject information acquisition unit to make the user select one of the two or more units of basic information, and displays subject information of a subject corresponding to the selected basic information.

In a case where the radio receiver receives the plurality of radio signals at the same time, the radio receiver may enhance the directivity of receiving the radio signals, and the imaging unit may make its angle of view narrower in accordance with a change of the directivity of the radio receiver.

According to the second embodiment of the present invention, an information storage server for storing information acquired from an imaging device including: an imaging unit for continuously imaging a plurality of subjects to acquire a moving image; and a radio receiver for receiving a plurality of radio signals respectively output from RF tags attached to the plurality of subjects to acquire a plurality of units of subject identification information respectively indicated by the plurality of radio signals, the subject identification information being information for identifying a corresponding one of the subjects, the radio receiver moving together with the imaging unit and having a directivity in a direction approximately the same as an imaging direction of the imaging unit is provided. The information storage server comprises: a field intensity acquisition unit operable to acquire changes in field intensities of the plurality of radio signals received by the radio receiver; an identification information acquisition unit operable to acquire the plurality of units of subject identification information acquired by the radio receiver; a moving image acquisition unit operable to acquire the moving image acquired by the imaging unit; a moving amount calculation unit operable to calculate a moving amount of the radio receiver based on the moving image acquired by the moving image acquired unit; and a subject direction specifying unit operable to specify directions of the plurality of subjects respectively identified by the plurality of units of subject identification information with respect to the imaging device, based on the changes in the field intensities of the plurality of radio signals received by the field intensity acquisition unit, the changes corresponding to the calculated moving amount of the radio receiver.

The subject identification information may contain item identification information for identifying an item that is the corresponding one subject and owner identification information for identifying the item, and the information storage server may further comprise: an item information storage unit operable to store item information that is information on the item identified by the item identification information to be associated with the item identification information; an item information request receiver operable to obtain a transmission request for the item information by receiving the subject identification information from the imaging device; an item information transmitter operable to transmit the item information associated with the item identification information contained in the subject identification information received by the item information request receiver, to the imaging device; and a point counter operable to increase the number of points accumulated in order to provide an item or service to the owner identified by the owner identification information contained in the subject identification information received by the item information request receiver, to be associated with the owner identification information.

The point counter may increase the number of points in a case where a user of the imaging device bought the item after browsing the item information.

According to the third aspect of the present invention, an article identification apparatus for receiving a radio signal output from an RF tag attached to an article to acquire information on the article and identify the article, comprises: a radio receiver operable to receive a plurality of radio signals respectively output from RF tags attached to a plurality of articles and acquire a plurality of units of article information respectively indicated by the plurality of radio signals, the article information being information on a corresponding one of the plurality of articles; an article position specifying unit operable to specify positions of the plurality of articles based on changes in field intensities of the plurality of radio signals received by the radio receiver; and an article information storage unit operable to store the plurality of units of article information acquired by the radio receiver and the positions of the articles specified by the article position specifying unit to be associated with each other.

The article identification apparatus may further comprise: an imaging unit operable to continuously image the plurality of articles to acquire a moving image; and a moving amount calculation unit operable to calculate moving amounts of the articles based on the moving image acquired by the imaging unit, wherein the article position specifying unit specifies the positions of the plurality of articles based on the changes in the field intensities of the plurality of radio signals received by the radio receiver, corresponding to the moving amounts of the articles calculated by the moving amount calculation unit.

The article information may be information indicating a place into which the corresponding article is sorted, and the article identification apparatus may further comprise a sorting unit operable to sort an article existing on a position that is stored in the item information storage unit to be associated with the item information, based on the item information.

The article information may be information indicating a predetermined mark or label to be attached to the corresponding article, and the article identification apparatus may further comprise a marking unit operable to attach a predetermined mark or label to an article placed on a position that is stored in the item information storage unit to be associated with the item information, based on the item information.

According to the present invention, it is possible to provide an imaging device that can correctly specify a direction of a subject and acquire a taken image of the subject and subject identification information thereof to be associated with each other.

According to the fourth aspect of the present invention, an imaging device for imaging a subject, comprises: a moving image acquisition unit operable to continuously image the subject to acquire a moving image; an imaging-restriction signal receiver operable to receive an imaging-restriction signal output from a transmitter attached to the subject, the imaging-restriction signal moving together with the moving image acquisition unit and having directivity in a direction approximately the same as an imaging direction of the moving image acquisition unit; a moving amount calculation unit operable to calculate a moving amount of the imaging-restriction signal receiver based on the moving image; a subject specifying unit operable to specify the subject to which the transmitter outputting the received imaging-restriction signal is attached based on a change in a field intensity of the received imaging-restriction signal, the change corresponding to the calculated moving amount of the imaging-restriction signal receiver; an imaging unit operable to acquire an image when an input of an instruction from a user was accepted, from the moving image; and an image-use restriction unit operable to restrict acquisition or use of the image containing the specified subject.

The image-use restriction unit may perform setting to prevent the imaging unit from accepting the input of the instruction from the user.

The image-use restriction unit may perform setting to prevent transmission of the image containing the subject specified by the subject specifying unit.

The image-use restriction unit may store the image containing the subject specified by the subject specifying unit after obscuring a region of the subject in the image with mosaic or trimming the region.

The imaging device may further comprise a display unit operable to display the moving image acquired by the moving image acquisition unit and an image indicating a region of the subject specified by the subject specifying unit while superimposing the moving image and the image indicating the region of the subject.

The imaging device may further comprise an alarm device operable to make an alarm sound when the imaging unit imaged the subject specified by the subject specifying unit.

The transmitter may be a cellular phone carried by a person who is the subject, and the imaging-restriction signal receiver may receive the imaging-restriction signal output from the cellular phone.

The imaging device may further comprise an identification information transmitter operable to transmit user identification information to the cellular phone when the imaging unit imaged the subject specified by the subject specifying unit, the user identification information being information for identifying the user.

The imaging device may further comprise: an image saving unit operable to save the image acquired by the imaging unit in an image server on the Internet; and a browse information transmitter operable to transmit browse information to the cellular phone, the browse information being information for browsing the image containing the subject specified by the subject specifying unit on the Internet.

The transmitter may output any of a plurality of imaging-restriction signals of different types, and the image-use restriction unit may restrict acquisition or use of the image in accordance with a type of the imaging-restriction signal output from the transmitter.

The imaging device may further comprise: an imaging-restriction signal transmitter operable to transmit an imaging-restriction signal for restricting acquisition or use of an image of the user carrying the imaging device to another imaging device; an identification information receiver operable to receive user identification information from the other imaging device that images the user, the user identification information being information for identifying another user who carries the other imaging device; and a restriction lifting signal transmitter operable to transmit a restriction lifting signal for lifting restriction of acquisition or use of the image to the other imaging device when the identification information receiver received the user identification information.

The imaging device may further comprise an identification storage unit operable to store the user identification information of the other user who is not restricted from acquiring or using the image of the user, wherein the restriction lifting signal transmitter transmits the restriction lifting signal to the other imaging device in a case where the user identification information the identification information receiver received is stored in the identification information storage unit.

The imaging device may further comprise: an identification information receiver operable to receive an imaging-request signal requesting acquisition or use of an image of the user who carries the imaging device, as well as user identification information that is information for identifying another user who carries another imaging device transmitting the imaging-request signal, from the other imaging device; an identification information storage unit operable to store the user identification information for the other user who is not restricted from acquiring or using the image of the user; and an imaging-restriction signal transmitter operable to transmit an imaging-restriction signal for restricting acquisition or use of the image of the user in a case where the identification information storage unit does not store the user identification information received by the identification information receiver.

The transmitter may be attached to a book, and the image-use restriction unit may restrict acquisition or use of the image containing the book as the subject specified by the subject specifying unit.

The image-use restriction unit may restrict acquisition or use of the image containing the book when an field intensity of the imaging-restriction signal output from the transmitter exceeds a predetermined value.

According to the fifth aspect of the present invention, an imaging system comprises: an imaging device operable to image a subject; and a transmitter, attached to the subject, operable to transmit an imaging-restriction signal, wherein the imaging device includes: a moving image acquisition unit operable to acquire a moving image by continuously imaging the subject; an imaging-request signal transmitter operable to transmit an imaging-request signal requesting acquisition or use of an image of the subject to which the transmitter is attached; an imaging-restriction signal receiver operable to receive the imaging-restriction signal output from the transmitter, the imaging-restriction signal receiver moving together with the moving image acquisition unit and having directivity in a direction approximately the same as an imaging direction of the moving image acquisition unit; a moving amount calculation unit operable to calculate a moving amount of the imaging-restriction signal receiver based on the moving image acquired by the moving image acquisition unit; a subject specifying unit operable to specify the subject to which the transmitter outputting the received imaging-restriction signal is attached based on a change in a field intensity of the received imaging-restriction signal, the change corresponding to the calculated moving amount of the imaging-restriction signal receiver; an imaging unit operable to acquire an image when an input of an instruction from a user was accepted, from the moving image; and an image-use restriction unit operable to restrict acquisition or use of the image containing the subject specified by the subject specifying unit, and the transmitter transmits the imaging-restriction signal to the imaging device when receiving the imaging-request signal.

According to the sixth aspect of the present invention, an imaging system comprises: an imaging device operable to image a subject; and an output device operable to output an image taken by the imaging device. The imaging device includes: a moving image acquisition unit operable to acquire a moving image by continuously imaging the subject; an imaging-restriction signal receiver operable to receive an imaging-restriction signal output from a transmitter attached to the subject; the imaging-restriction signal receiver moving together with the moving image acquisition unit and having directivity in a direction approximately the same as an imaging direction of the moving image acquisition unit; a moving amount calculation unit operable to calculate a moving amount of the imaging-restriction signal receiver based on the moving image acquired by the moving image acquisition unit, a subject specifying unit operable to specify the subject to which the transmitter outputting the received imaging-restriction signal is attached based on a change in a field intensity of the received imaging-restriction signal, the change corresponding to the calculated moving amount of the imaging-restriction signal receiver; an imaging unit operable to acquire an image when an input of an instruction from a user was accepted, from the moving image; and an image storage unit operable to store the subject specified by the subject specifying unit and the image to be associated with each other. The output device restricts use of the image containing the subject specified by the subject specifying unit.

According to the present invention, an imaging device that can restricts acquisition or use of an image containing a predetermined subject can be provided.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 6 shows an exemplary data format of an item information storage unit 424.

FIG. 7 shows an exemplary data format of a point information storage unit 430.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Embodiment 1

Figure 1:
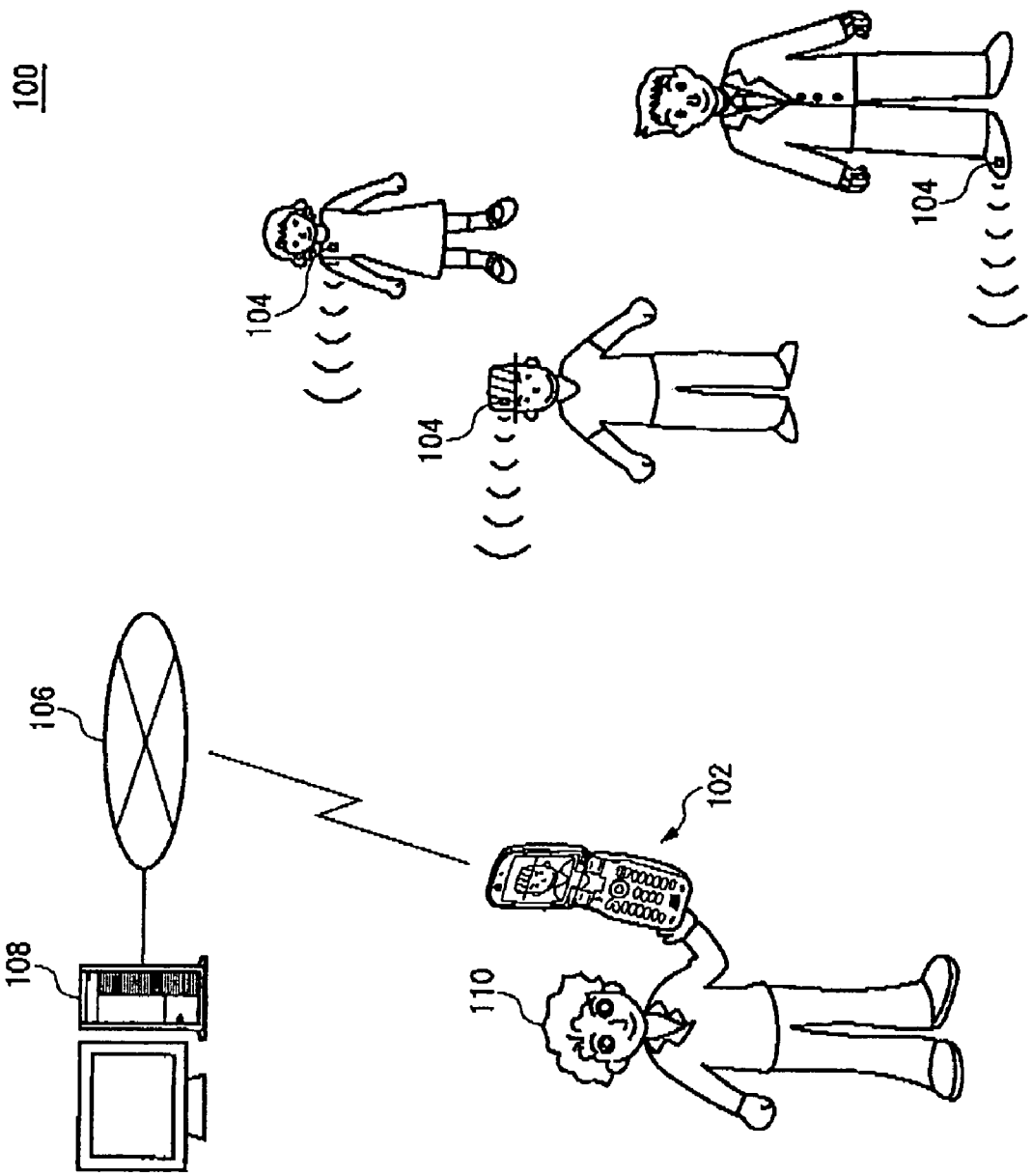
FIG. 1 shows an exemplary structure of an information providing system 100 according to the present invention.

FIG. 1 shows an exemplary structure of an information providing system 100 according to the first embodiment of the present invention. The information providing system 100 includes a cellular phone 102 with a camera, an RF (radio frequency) tag 104 attached to a subject, and an information storage server 108 that communicates with the cellular phone 102 via a communication network 106 and stores information acquired by the cellular phone 102. The cellular phone 102 is an exemplary imaging unit of the present invention.

When a user 110 encountered an attractive item such as a cap, clothes or shoes, the user 110 takes an image of that item there by using the cellular phone 102. The cellular phone 102 images the item in accordance with an instruction from the user 110 and receives a radio signal transmitted from the RF tag 104 attached to the item so as to acquire item identification information and owner identification information of that item. The cellular phone 102 also performs imaging continuously so as to acquire a moving image before and after the imaging of the item in accordance with the user's instruction, and calculates the movement of the cellular phone 102 with respect to the radio signal transmitted from the RF tag 104 based on that moving image. Moreover, the cellular phone 102 acquires a change in a field intensity of each of a plurality of radio signals respectively transmitted from a plurality of RF tags 104 before and after the imaging of the item in accordance with the user's instruction. Then, the cellular phone 102 specifies the radio signal transmitted from the RF tag 104 attached to the item for which the image was taken in accordance with the user's instruction, based on the change in the field intensity of each of the radio signals with respect to the movement of the cellular phone 102. The cellular phone 102 stores item identification information and owner identification information indicated by the radio signal that was received when the image of the item was taken, so as to be associated with that image.

The information storage server 108 stores a phone number and a map of a shop that sells the item to which the RF tag 104 is attached, or the like. The cellular phone 102 connects with the information storage server 108 via the communication network 106 and extracts item information that is information on the item by using the item identification information acquired from the RF tag 104 attached to the item. Then, the cellular phone 102 provides the item information acquired from the information storage server 108 to the user 110 by displaying the item information. Moreover, the information storage server 108 stores information on an owner of the item and manages points or the like for offering benefits to the owner who contributes to advertisement of the item.

According to the information providing system 100 of the present embodiment, it is possible to provide a phone number or a map of a shop selling an item that suits the preference of the user 110 to the user 110 rightly and promptly by using the cellular phone 102. Therefore, when the user 110 encountered an attractive item on the street, for example, the user 110 can obtain information on that item easily.

Figure 2:
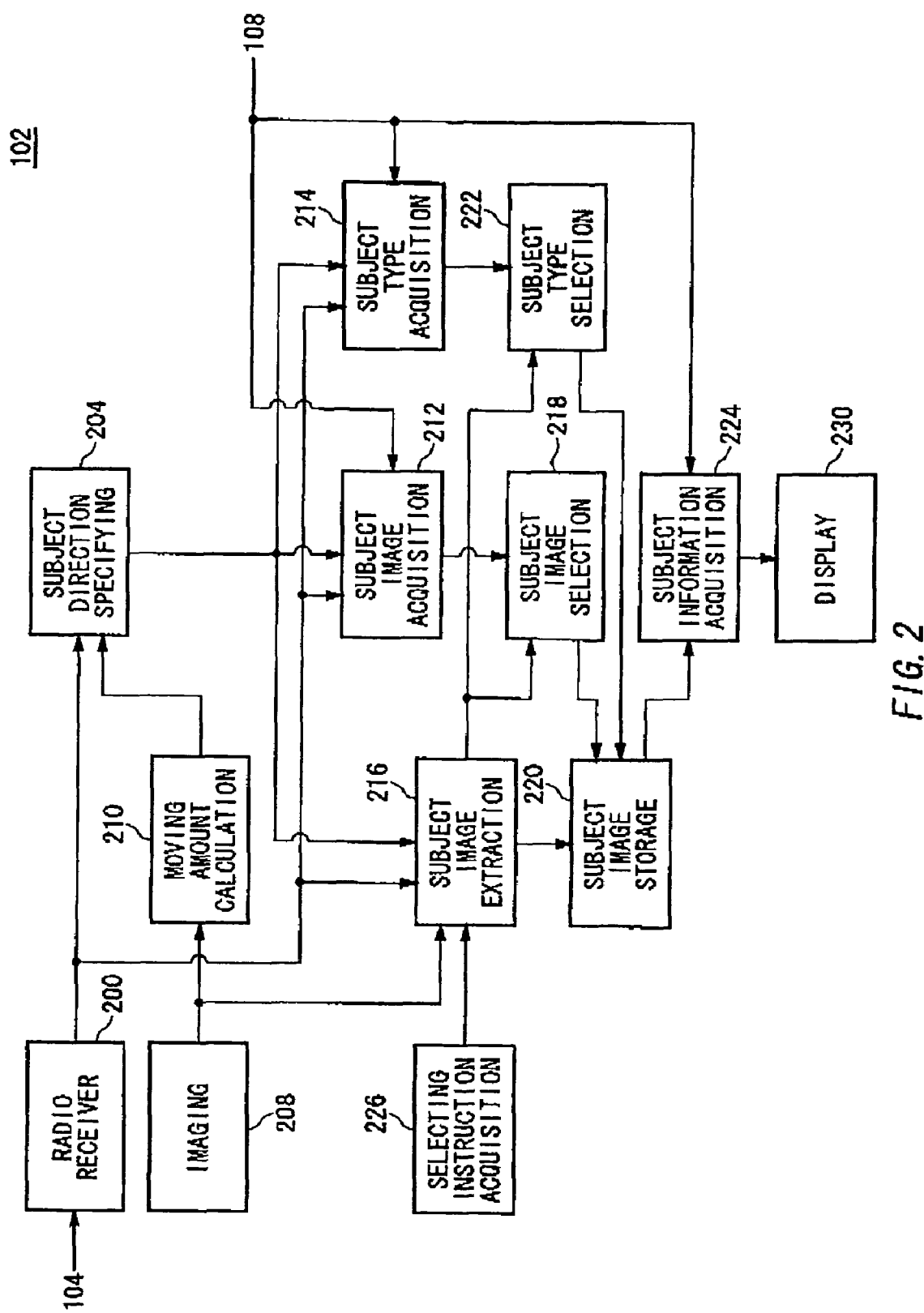
FIG. 2 shows an exemplary structure of a cellular phone 102 according to the first embodiment of the present invention.

FIG. 2 shows an exemplary structure of the cellular phone 102 according to the present embodiment. The cellular phone 102 includes a radio receiver 200, a subject direction specifying unit 204, an imaging unit 208, a moving amount calculation unit 210, a subject image acquisition unit 212, a subject type acquisition unit 214, a subject image extraction unit 216, a subject image selection unit 218, an image storage unit 220, a subject type selection unit 222, a subject image acquisition unit 224, a selecting instruction acquisition unit 226 and a display unit 230.

The imaging unit 208 continuously images a plurality of subjects so as to acquire a moving image. The radio receiver 200 receives a plurality of radio signals respectively output from RF tags 104 attached to those subjects and acquires a plurality of units of subject identification information respectively indicated by the radio signals, each of which is information for identifying a corresponding one subject. The radio receiver 200 is provided at a fixed distance from the imaging unit 208 and translates and rotates together with the imaging unit 208 based on the movement of the user 110. It is preferable that the radio receiver 200 have directivity in a direction approximately the same as an imaging direction of the imaging unit 208 and the directivity be approximately the same as an angle of view of the imaging unit 208. In a case where there are two or more subjects with RF tags 104 in the direction of the directivity of the radio receiver 200 and the radio receiver 200 receives two or more radio signals at the same time, the radio receiver 200 may enhance the directivity of receiving the radio signals, and the imaging unit 208 may make the angle of view narrower in accordance with the change of the directivity of the radio receiver 200 by optical zoom-up.

The moving amount calculation unit 210 calculates the moving amount of the radio receiver 200 based on the moving image acquired by the imaging unit 208. The subject direction specifying unit 204 specifies directions of the subjects respectively identified by a plurality of units of subject identification information acquired by the radio receiver 200, based on the changes in the field intensities of the respective radio signals received by the radio receiver 200, that correspond to the moving amount of the radio receiver 200 calculated by the moving amount calculation unit 210.

The selecting instruction acquisition unit 226 acquires a selecting instruction from the user 110 while the imaging unit 208 continuously images a plurality of subjects to acquire the moving image. More specifically, the selecting instruction acquisition unit 226 acquires a selecting instruction when the user 110 pressed a release button. Then, the subject image extraction unit 216 extracts a subject image when the selecting instruction unit 226 acquired the selecting instruction from the moving image acquired by the imaging unit 208. The subject image extraction unit 216 also acquires subject identification information the radio receiver 200 acquired from a direction of a subject contained in the extracted subject image. The image storage unit 220 stores subject identification information the radio receiver 200 acquired from the direction of the subject contained in the extracted subject image, so as to be associated with the extracted subject image.

As described above, by calculating the moving amount of the radio receiver 200 based on the moving image acquired by the imaging unit 208, it is possible to calculate the moving amount of the radio receiver 200 correctly even in a case where the user 110 moved the cellular phone 102 unintentionally. Thus, the subject direction specifying unit 204 can specify the direction of the subject correctly and therefore it is possible to acquire the subject image selected by the user 110 and the subject identification information in such a manner that they are associated with each other.

Moreover, in a case where there are two or more subjects attached with RF tags 104 in approximately the same direction with respect to the cellular phone 102, the radio receiver 200 acquires two or more units of subject identification information from the direction of the subject contained in the subject image extracted by the subject image extraction unit 216 in accordance with the user's selecting instruction. In this case, the subject image acquisition unit 212 acquires two or more subject images that are images of subjects respectively identified by the two or more units of subject identification information the radio receiver 200 acquired, from the information storage server 108. Then, the subject image selection unit 218 compares the subject image extracted by the subject image extraction unit 216 with each of the two or more subject images the subject image acquisition unit 212 acquired, for example, by image matching, and selects one of the two or more subject images that is similar to the subject image extracted by the subject image extraction unit 216. Then, the image storage unit 220 stores subject identification information for identifying the subject image selected by the subject image selection unit 218, from the two or more units of subject identification information the radio receiver 200 acquired, so as to be associated with the subject image extracted by the subject image extraction unit 216.

Moreover, in a case where the radio receiver 200 acquired two or more units of subject identification information from the direction of the subject contained in the subject image extracted by the subject image extraction unit 216, the subject type acquisition unit 214 may acquire subject types of subjects respectively identified by the two or more subject identification information the radio receiver 200 acquired, from the information storage server 108. The subject type is a type of a subject with an RF tag 104, for example, a cap, clothes or shoes. The subject type selection unit 222 then specifies which site of a human body was imaged as the subject in the subject image extracted by the subject image extraction unit 216. Then, the subject type selection unit 222 selects one of the subject types the subject type acquisition unit 214, that corresponds to the specified site of the human body. In a case where the site of the human body is a foot, for example, the subject type selection unit 222 selects shoes as the subject type. In a case where the site of the human body is a head, the subject type selection unit 222 selects a cap. Then, the image storage unit 220 stores the subject identification information that identifies the subject type selected by the subject type selection unit 222 so as to be associated with the subject image extracted by the subject image extraction unit 216.

As described above, by specifying the subject identification information of the subject contained in the subject image extracted by the subject image extraction unit 216 by using the subject image or subject type that was acquired from the information storage server 108, it is possible to acquire the subject image selected by the user 110 and the subject identification information corresponding thereto while they are associated with each other correctly, even in an environment where there are a plurality of RF tags 104.

Next, the subject information acquisition unit 224 acquires subject information that is information on the subject with the RF tag 104 identified by the subject identification information stored by the image storage unit 220 to be associated with the subject image, from the information storage server 108. The display unit 230 displays the thus acquired subject information, thereby providing it to the user 110. Please note that the subject information is information showing a phone number or map of a shop that sells an item as the subject, for example. Thus, the user 110 can obtain an image on an item with an RF tag 104 only by taking an image of that item.

In a case where the radio receiver 200 acquired two or more units of subject identification information from the direction of the subject contained in the subject image extracted by the subject image extraction unit 216, the image storage unit 220 may store the two or more units of subject identification information to be associated with that extracted subject image. Then, the subject image acquisition unit 224 acquires basic information, that is simpler than the subject information, from the information storage server 108 for each of subjects respectively identified by the two or more units of subject identification information stored in the image storage unit 220. The basic information may be the aforementioned subject type or a part of the aforementioned subject information. Then the display unit 230 displays a plurality of units of basic information thus acquired in form of a list, so as to make the user 110 select one. The subject information acquisition unit 224 then acquires the subject information of the subject associated with the basic information selected by the user 110, from the information storage server 108. The display unit 230 may display the display information the subject information acquisition unit 224 acquired.

Figure 3:
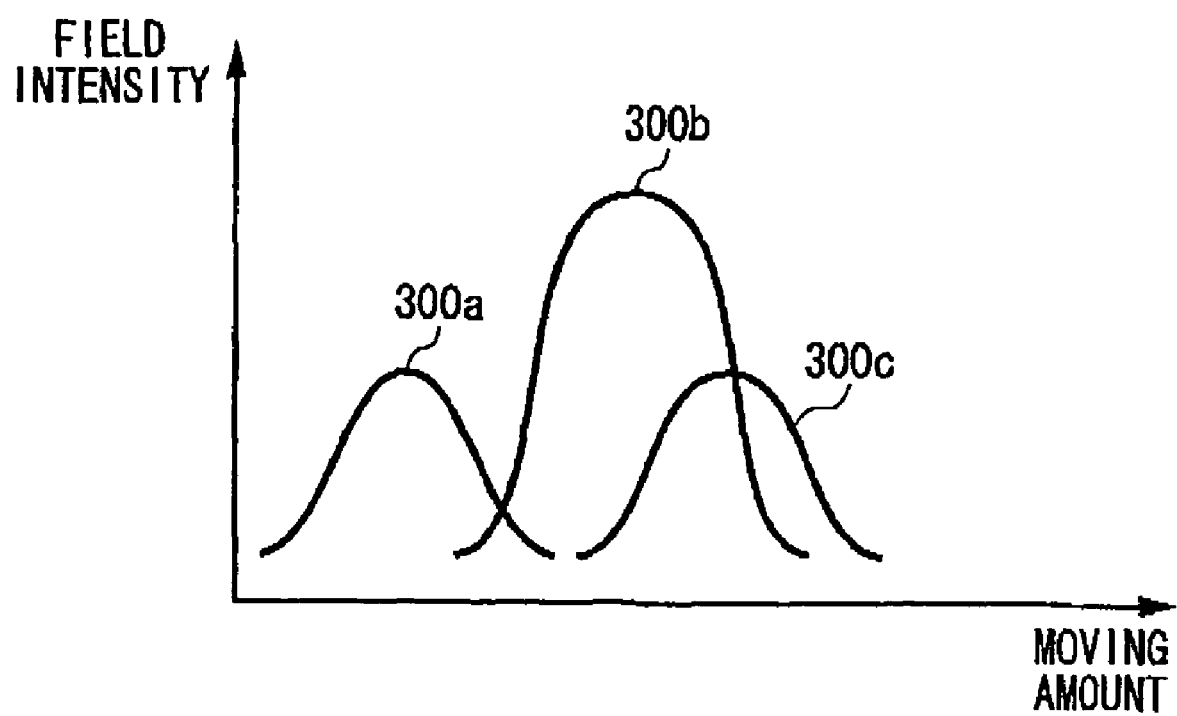
FIG. 3 shows an exemplary relationship between the moving amount and the field intensity.

FIG. 3 shows an exemplary relationship between the moving amount of the radio receiver 200 of the present embodiment and a field intensity the radio receiver 200 receives. The horizontal axis represents the moving amount of the radio receiver 200 calculated by the moving amount calculation unit 210 based on the moving image the imaging unit 208 acquired, while the vertical axis represents the field intensities of a plurality of radio signals 300*a*, 300*b* and 300*c* received by the radio receiver 200. The radio signals 300*a*, 300*b* and 300*c* are output from a plurality of RF tags 104 attached to a plurality of subjects, respectively. Each radio signal indicates subject identification information different from that indicated by the other radio signal. As shown in FIG. 3, the field intensities of the radio signals 300*a*, 300*b* and 300*c* the radio receiver 200 received change with the movement of the radio receiver 200. Thus, by performing continuous imaging by the imaging unit 208 to acquire a moving image while the radio receiver 200 continuously receives the radio signals 300*a*, 300*b*, and 300*c*, even in a case where a plurality of RF tags 104 attached to a plurality of subjects exist close, the subject direction specifying unit 204 can specify the directions of the respective subjects based on the changes in the field intensities of the radio signals 300*a*, 300*b* and 300*c*.

Figure 4:
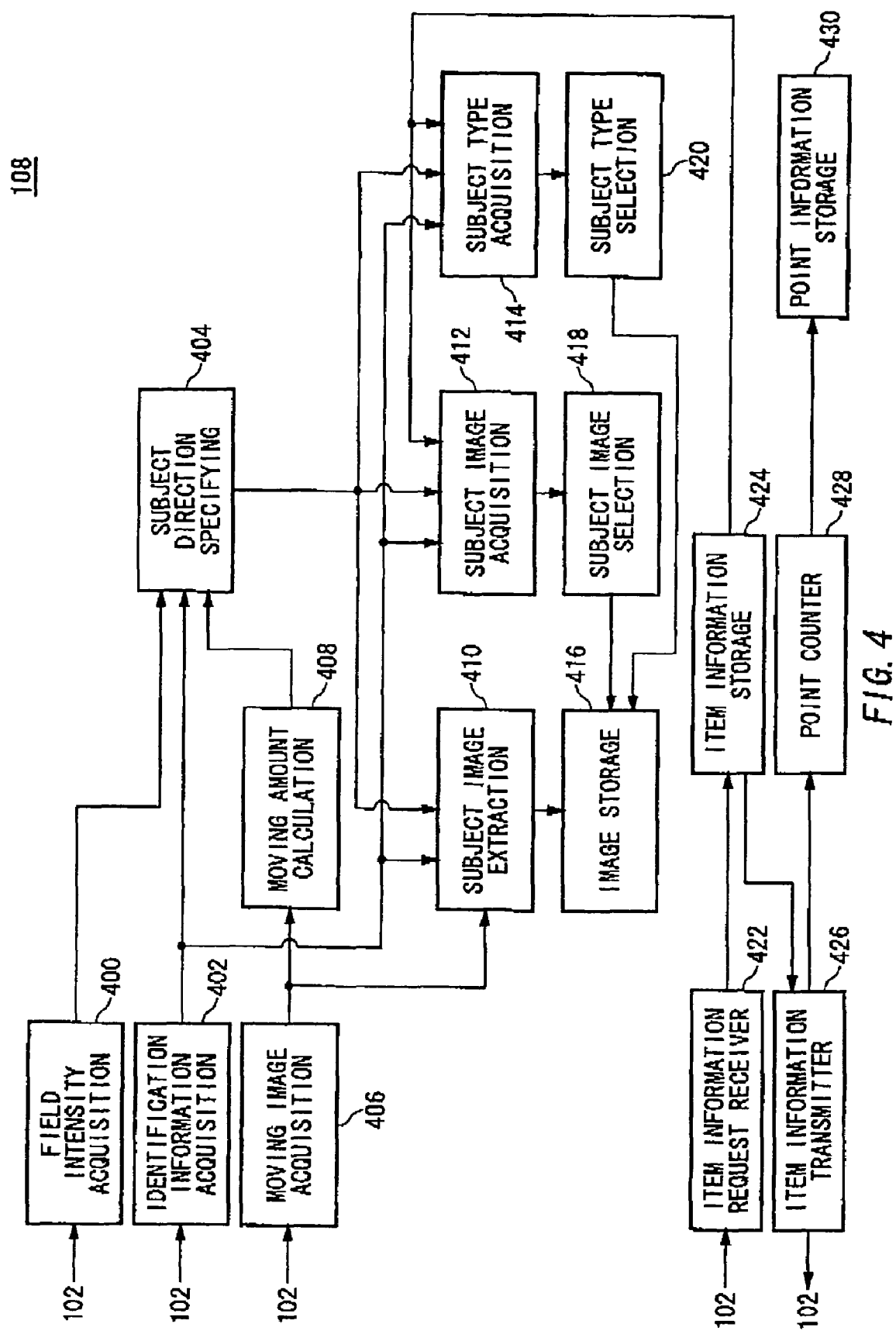
FIG. 4 shows an exemplary structure of an information storage server 108.
Figure 5:
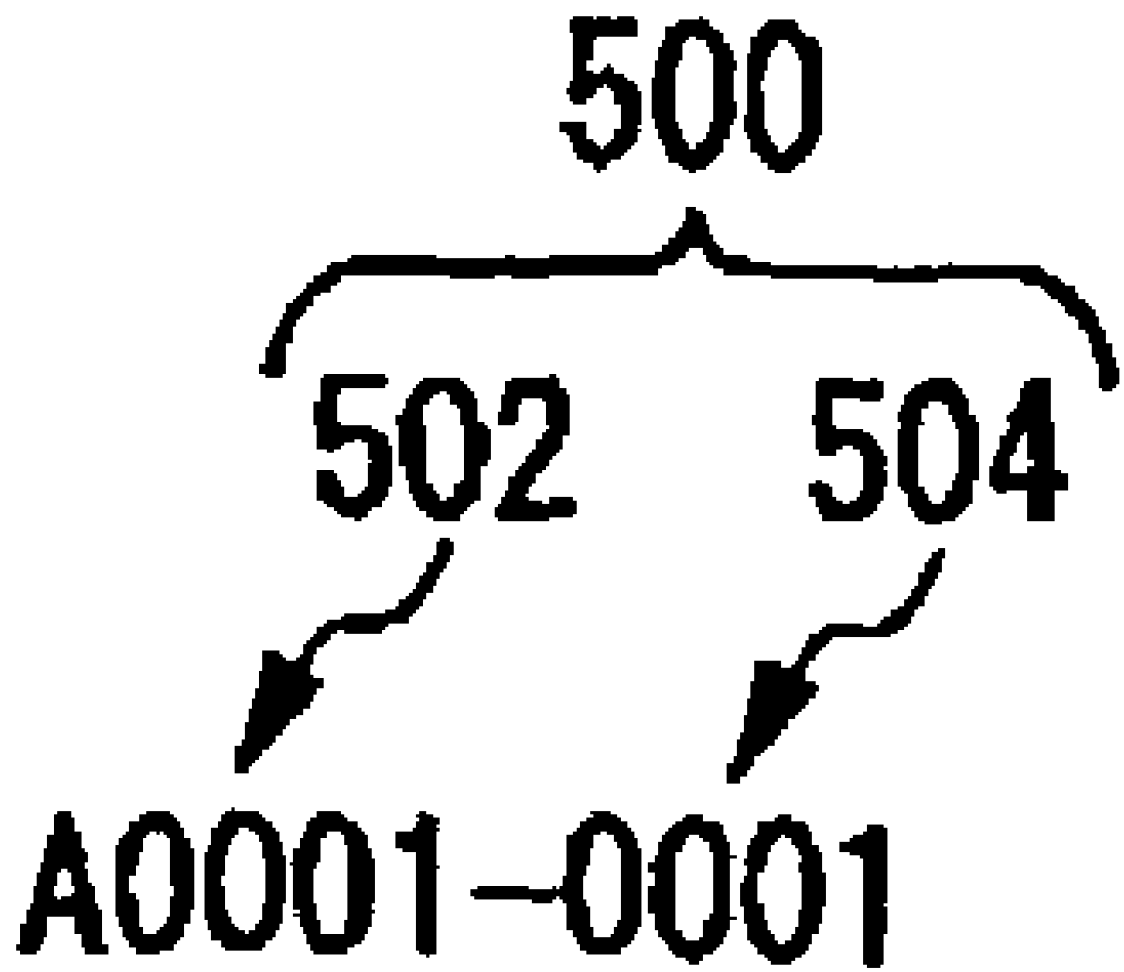
FIG. 5 shows an example of subject identification information 500.

FIG. 4 shows an exemplary structure of the information storage server 108 according to the present embodiment. FIG. 5 shows an example of the subject identification information 500 of the present embodiment. FIG. 6 shows an exemplary data format of an item information storage unit 424 of the present embodiment. FIG. 7 shows an exemplary data format of a point information storage unit 430 of the present embodiment.

As shown in FIG. 4, the information storage server 108 includes a field intensity acquisition unit 400, an identification information acquisition unit 402, a subject direction specifying unit 404, a moving image acquisition unit 406, a moving amount calculation unit 408, a subject image extraction unit 410, a subject image acquisition unit 412, a subject type acquisition unit 414, an image storage unit 416, a subject image selection unit 418, a subject type selection unit 420, an item information request transmitter 422, an item information storage unit 424, an item information transmitter 426, a point counter 428 and a point information storage unit 430.

The field intensity acquisition unit 400 acquires the change in the field intensity of each of a plurality of radio signals the radio receiver 200 received, from the cellular phone 102. The identification information acquisition unit 402 acquires a plurality of units of subject identification information the radio receiver 200 acquired, from the cellular phone 102. The moving image acquisition unit 406 acquires the moving image the imaging unit 208 acquired, from the cellular phone 102. The moving amount calculation unit 408 calculates the moving amount of the radio receiver 200 based on the moving image the moving image acquisition unit 406 acquired. Then, the subject direction specifying unit 404 specifies the directions of the subjects respectively identified by a plurality of units of subject identification information the radio receiver 200 acquired with respect to the cellular phone 102 based on the changes in the field intensities of the radio signals the field intensity acquisition unit 400 received corresponding to the moving amount of the radio receiver 200 calculated by the moving amount calculation unit 400. In other words, the subject direction specifying unit 404 and the moving amount calculation unit 408 may have the same functions as those of the subject direction specifying unit 204 and the moving amount calculation unit 210 of the cellular phone 102, respectively, so that the information storage server 108 specifies the directions of the respective subjects with respect to the cellular phone 102.

The subject image extraction unit 410, the subject image acquisition unit 412, the subject type acquisition unit 414, the image storage unit 416, the subject image selection unit 418 and the subject type selection unit 420 have the same functions as those of the subject image extraction unit 216, the subject image acquisition unit 212, the subject type acquisition unit 214, the image storage unit 220, the subject image selection unit 218 and the subject type selection unit 222 of the cellular phone 102, respectively, and the description thereof is omitted.

The subject identification information 500 contains item identification information 502 for identifying an item as a subject with an RF tag 104 attached thereto and owner identification information 504 for identifying the owner of that item, as shown in FIG. 5. The item identification information 502 is assigned to every item. A plurality of RF tags 104 attached to a plurality of items that are the same carry the same item identification information 502 and output that item identification information 502 as radio signals. The owner identification information 504 is assigned to every owner. A plurality of RF tags 104 attached to a plurality of items owned by the same owner carry the same owner identification information 504 and output that owner identification information 504 together with the item identification information as the radio signals. Thus, based on the subject identification information 500, it is possible to recognize what is the item corresponding to that subject identification information 500 and who owns that item.

The item information storage unit 424 stores item information such as an image of an item identified item identification information, a phone number of a shop selling that item, and a map of that shop, so as to be associated with that item identification information, as shown in FIG. 6. The item information request transmitter 422 receives the subject identification information containing the item identification information and the owner identification information from the cellular phone 102, thereby accepting a transmission request of the item information. Then, the item information transmitter 426 extracts from the item information storage unit 424 the item information associated with the item identification information contained in the received subject identification information from information, and transmits the extracted item information to the cellular phone 102.

The point information storage unit 430 stores, for each unit of the owner identification information, the number of points that are counted in order to provide an item or service to the owner identified by that owner identification information, as shown in FIG. 7. The owner identification information and the corresponding number of points are stored to be associated with each other. The point counter 428 increases the number of points stored in the point information storage unit 430 so as to be associated with the owner identification information contained in the subject identification information the item information request transmitter 422 received. In other words, it is determined that the owner of the item for which the item information was requested contributed to advertisement of that item and therefore he/she can achieve a benefit of acquiring a point. Moreover, in a case where the user 110 of the cellular phone 102 bought an item after browsing the item information of that item, the point counter 428 may increase the number of points stored in the point information storage unit 430 to be associated with the owner identification information contained in the subject identification information received by the item information request transmitter 422. In other words, it may be determined that the owner of the item for which the item information was requested assisted the sales of that item, and that owner may achieve the benefit of acquiring a point. In addition, the information storage server 108 may quantify the contribution of advertisement and/or sales of items for each owner so as to rank the owners and may offer more advantageous benefits to owners who placed higher in the ranking.

Figure 8:
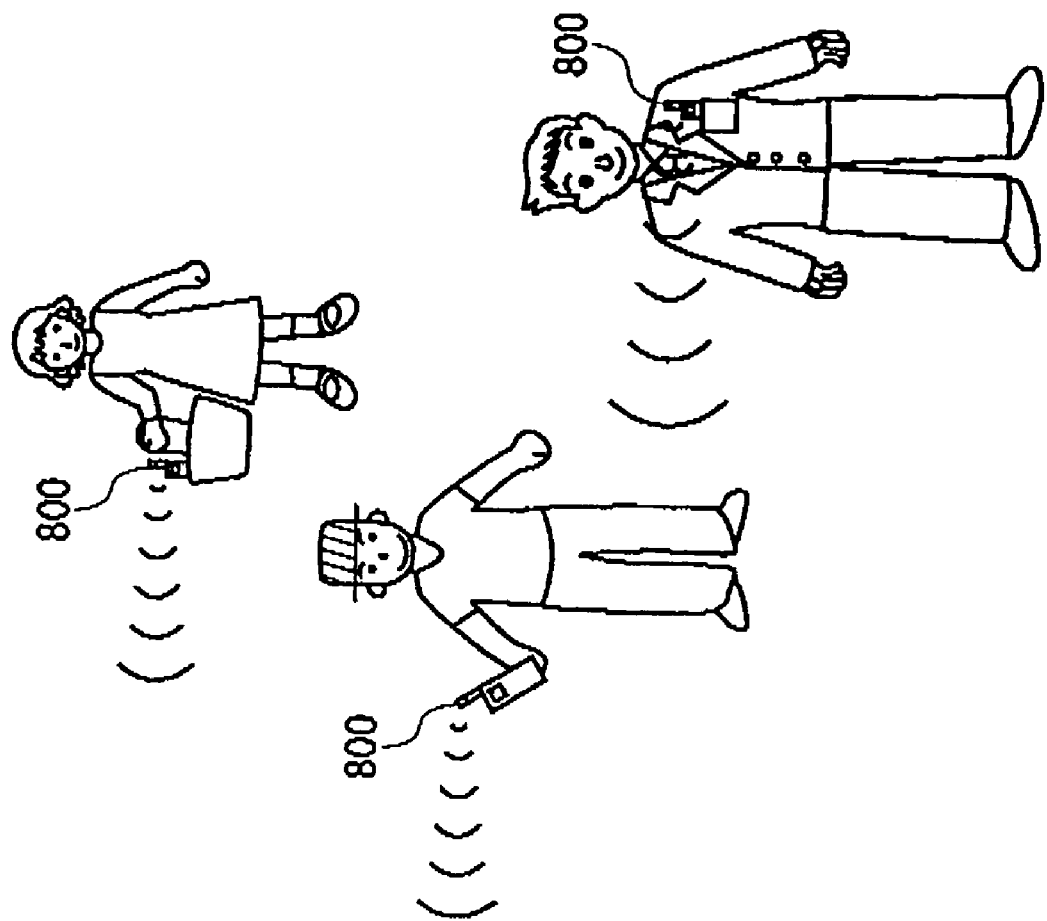
FIG. 8 shows another exemplary usage of the cellular phone 102.
Figure 8:
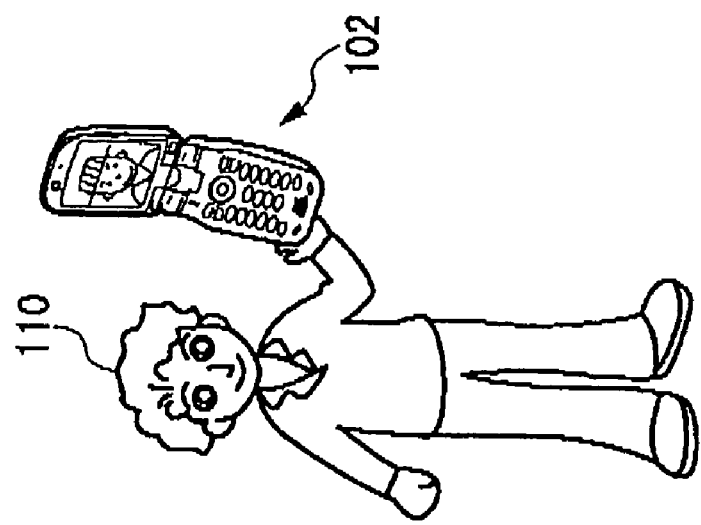

FIG. 8 shows another exemplary use of the cellular phone 102 of the present embodiment. The cellular phone 102 described referring to FIGS. 1–7 acquired the item identification information and the owner identification information as the subject identification information from the RF tag 104. Alternatively, the cellular phone 102 may acquire from another cellular phone 800 a phone number or e-mail address of the cellular phone 800 as the subject identification information. Except for the following, the cellular phone 102 has the same structure and function as those of the cellular phone 102 described referring to FIGS. 1–7 and the description thereof is partially omitted.

The cellular phone 800 is an exemplary RF tag of the present invention and outputs a radio signal indicating the phone number or e-mail address of the cellular phone 800 as the subject identification information. The imaging unit 208 of the cellular phone 102 continuously images owners of a plurality of cellular phones 800, thereby acquiring a moving image. The radio receiver 200 receives a plurality of radio signals output from the cellular phones 800 carried by a plurality of owners, respectively, so as to acquire the phone number or e-mail address of each cellular phone 800 indicated by the corresponding one of the radio signals. The moving amount calculation unit 210 calculates the moving amount of the radio receiver 200 based on the moving image the imaging unit 208 acquired. The subject direction specifying unit 204 specifies the subjects respectively identified by the phone numbers or e-mail addresses the radio receiver 200 acquired, based on the change in the field intensities of the radio signals received by the radio receiver 200 corresponding to the moving amount of the radio receiver 200 calculated by the moving amount calculation unit 210.

The selecting instruction acquisition unit 226 acquires a selecting instruction from the user 110 while the imaging unit 208 continuously images a plurality of owners. The subject image extraction unit 216 extracts an owner image that is an image of an owner as the subject image when the selecting instruction acquisition unit 226 acquired the selecting instruction, from the moving image the imaging unit 208 acquired. The subject image extraction unit 216 also acquires the phone number or e-mail address the radio receiver 200 acquired from the direction of the owner contained in the extracted owner image. The image storage unit 220 stores the phone number or e-mail address the radio receiver 200 received from the direction of the owner contained in the extracted owner image to be associated with the extracted owner image.

As described above, according to the cellular phone 102 of this example, it is possible to acquire the phone number or e-mail address of the cellular phone 800 to be correctly associated with the image of the owner and automatically register the phone number or e-mail address without a complicated operation.

Embodiment 2

Figure 9:
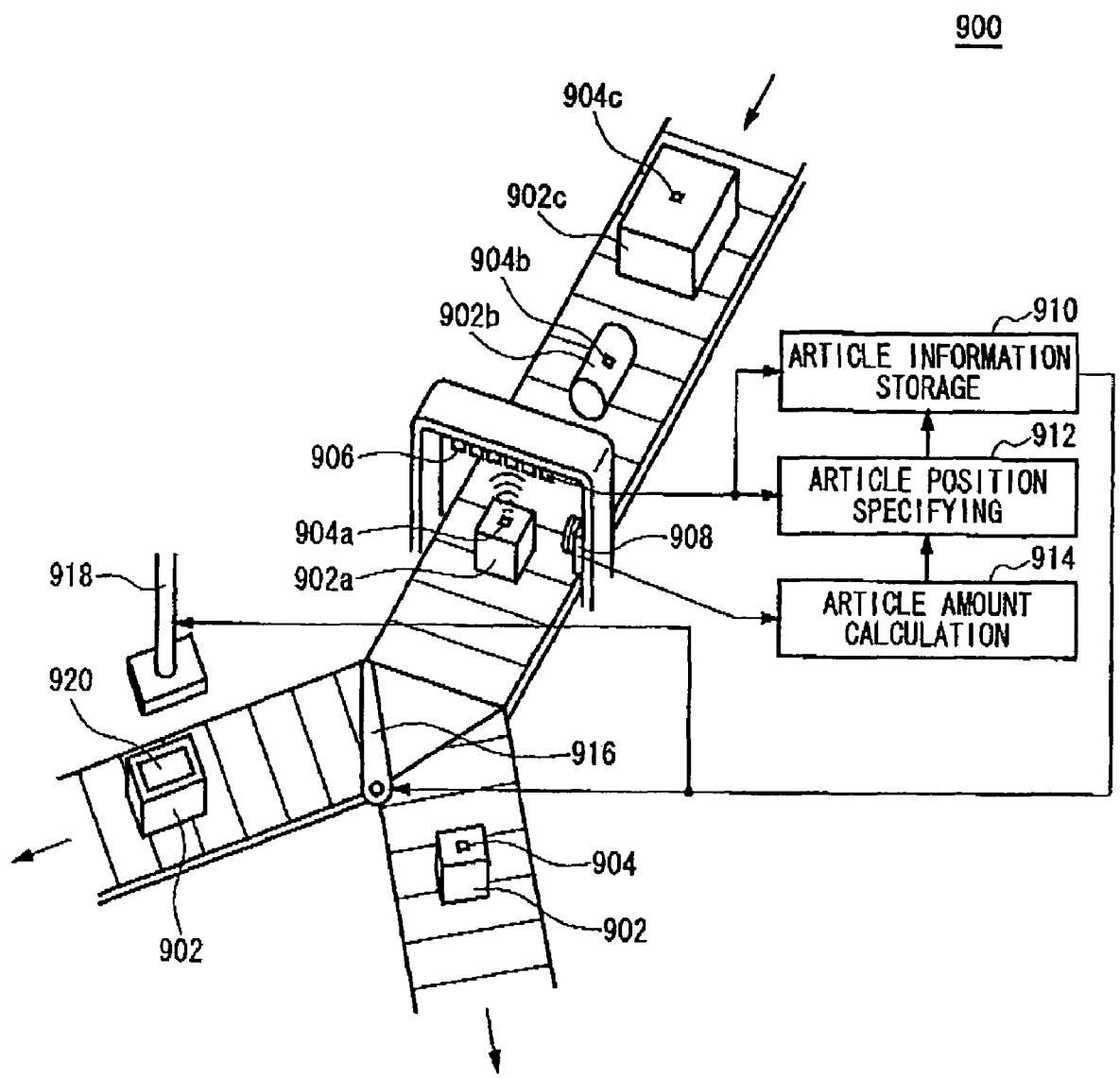
FIG. 9 shows an exemplary structure of an article identification apparatus 900.

FIG. 9 shows an exemplary structure of an article identification apparatus 900 according to the second embodiment of the present invention. The article identification apparatus 900 receives a radio signal from an RF tag 904 attached to an article 902, thereby receiving information on the article 902 and identifying the article 902. For example, in a delivery company, manufacturer, retailer or the like, an RF tag 904 is attached to an article 902. The RF tag 904 carries information such as a sender, address for delivery, manufacturer, distributor, destination, and a type of the article such as fragile or perishable, for example. The article identification apparatus 900 acquires, from the RF tag 904 attached to the article 902 carried by a belt conveyor or the like, information such as the address for delivery or destination of that article 902. The article identification apparatus 900 then sorts the article 902 based on the acquired information and gives a label on which the information such as the address for delivery or destination is described to the article 902. Moreover, the article identification apparatus 900 acquires information on the type of the article 902, for example, fragile or perishable, from the RF tag 904 attached to that article 902 and gives a mark or label indicating that that article 902 is fragile or perishable based on the acquired information.

The article identification apparatus 900 includes a radio receiver 906, an imaging unit 908, an article information storage unit 910, an article position specifying unit 912, a moving amount calculation unit 914, a sorting unit 916 and a marking unit 918. The radio receiver 906, the imaging unit 908 and the moving amount calculation unit 914 of the present embodiment may have the same functions as those of the radio receiver 200, the imaging unit 208 and the moving amount calculation unit 210 of the first embodiment.

The imaging unit 908 continuously images a plurality of articles 902, thereby acquiring a moving image. The radio receiver 906 receives a plurality of radio signals output from RF tags 904 attached to those articles 902, respectively, and acquires a plurality of units of article information carried by the respective radio signals. The article information is information on a corresponding article 902. The radio receiver 906 is provided near a path of the articles 902, such as a belt conveyor, for example. A plurality of radio receivers 906 may be provided along a direction perpendicular to the moving direction of the article 902. In this case, the two-dimensional position of the article 902 can be specified.

The article position specifying unit 912 specifies the positions of the respective articles 902 based on changes in field intensities of the respective radio signals the radio receiver 906 received. On the other hand, the moving amount calculation unit 914 calculates the moving amounts of the articles 902 based on the moving image acquired by the imaging unit 908. The article position specifying unit 912 then specifies the positions of the respective articles 902 based on the changes in the field intensities of the radio signals received by the radio receiver 906 that correspond to the moving amounts of the articles 902 calculated by the moving amount calculation unit 114. In this manner, by specifying the position of the article 902 based on both the radio signal and the moving image, it is possible to correctly specify the position of the article 902.

The article information storage unit 910 stores the article information the radio receiver 906 acquired and the position of the article 902 specified by the article position specifying unit 912 to be associated with each other. In a case where the article information is information related to a manner of sorting, such as information describing the address for delivery or destination, the sorting unit 916 performs sorting based on the article information stored in the article information storage unit 910. More specifically, based on the article information, the sorting unit 916 sorts the article 902 existing on the position that is stored to be associated with that article information. In a case where the article information is information indicating a predetermined mark or label that is to be given to the article 902 in order to display the type of the article 902, the marking unit 918 gives the predetermined mark or label 920 to the article 902 existing on the position that is stored to be associated with that article information, based on that article information.

As described above, by attaching the RF tag 904 for carrying various kinds of information on the article 902 to the article 902, it is possible to sort the article 902 and give a mark or label to the article 902 automatically by using the article identification apparatus 900.

Figure 10:
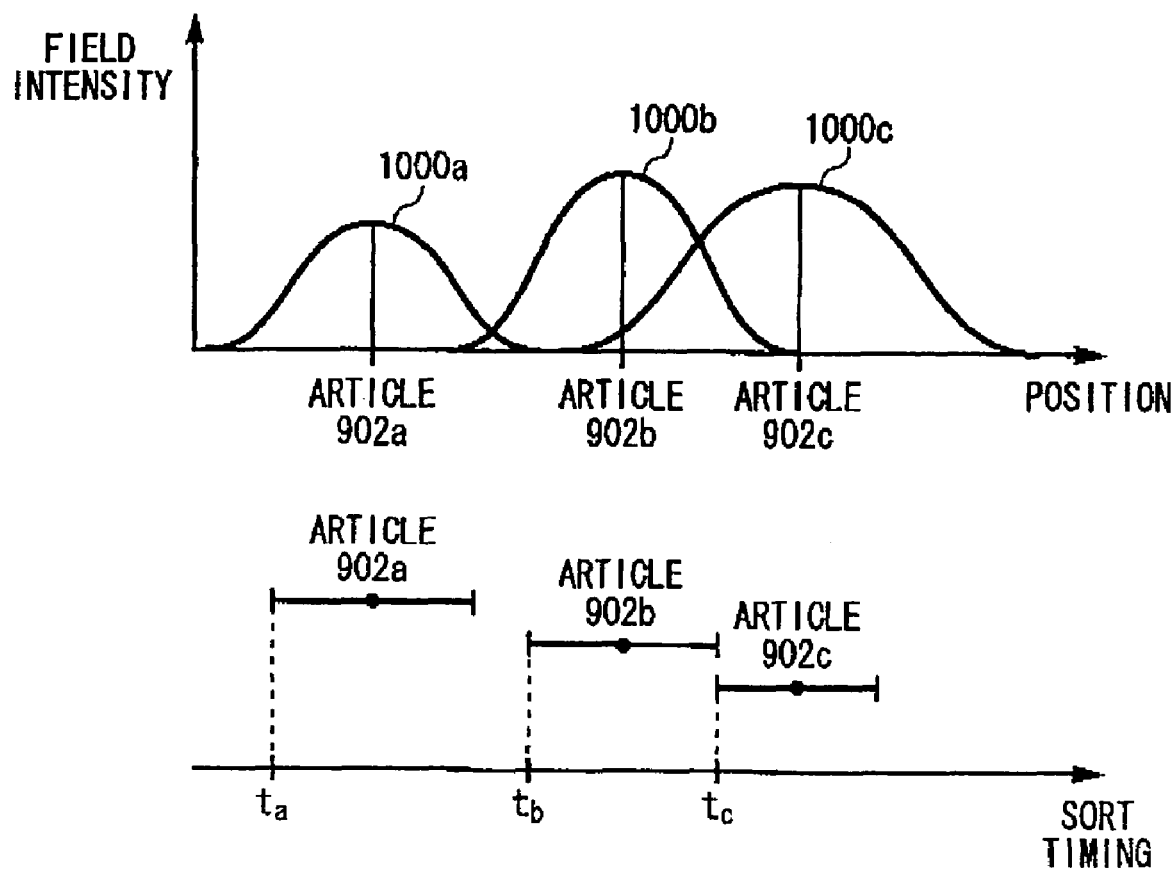
FIG. 10 shows an exemplary relationship between a position of an article 902 and field intensity.

FIG. 10 shows an exemplary relationship between the position of the article 902 and the field intensity the radio receiver 906 receives, and sort timings by the sorting unit 916 in the present embodiment. The horizontal axis in the upper graph represents positions of articles 902a, 902b, and 902c carried by a belt conveyor or the like, while the vertical axis represents the field intensities of radio signals 1000a, 1000b and 1000c received by the radio receiver 906. The horizontal axis in the lower diagram represents the sorting timing by the sorting unit 916.

The radio signals 1000a, 1000b and 1000c are output from the RF tags 904a, 904b and 904c attached to the articles 902a, 902b and 902c, respectively. Each of the radio signals 1000a, 1000b and 1000c carries article information different from that carried by the other radio signal. As shown in FIG. 10, the field intensities of the radio signals 1000a, 1000b and 1000c the radio receiver 906 receives change when the articles 902a, 902b and 902c move. Thus, from peaks of the field intensities, the article position specifying unit 912 can specify the positions of the articles 902a, 902b and 902c. Moreover, the imaging unit 908 continuously images the articles 902a, 902b and 902c to acquire a moving image, while the radio receiver 906 continuously receives the radio signals 1000a, 1000b and 1000c. Thus, even in a case where the RF tags 904a, 904b and 904c attached to the respective articles 902a, 902b and 902c exist close, the article position specifying unit 912 can correctly specify the positions of the respective articles 902a, 902b and 902c.

The sorting unit 916 operates at sorting timings ta, tb and tc that are determined based on the positions of the articles 902a, 902b and 902c, respectively, the positions being specified by the article position specifying unit 912 and being stored in the article information storage unit 910. Thus, the sorting unit 916 can sort each of the articles 902a, 902b and 902c in a manner indicated by the associated article information.

Embodiment 3

Figure 11:
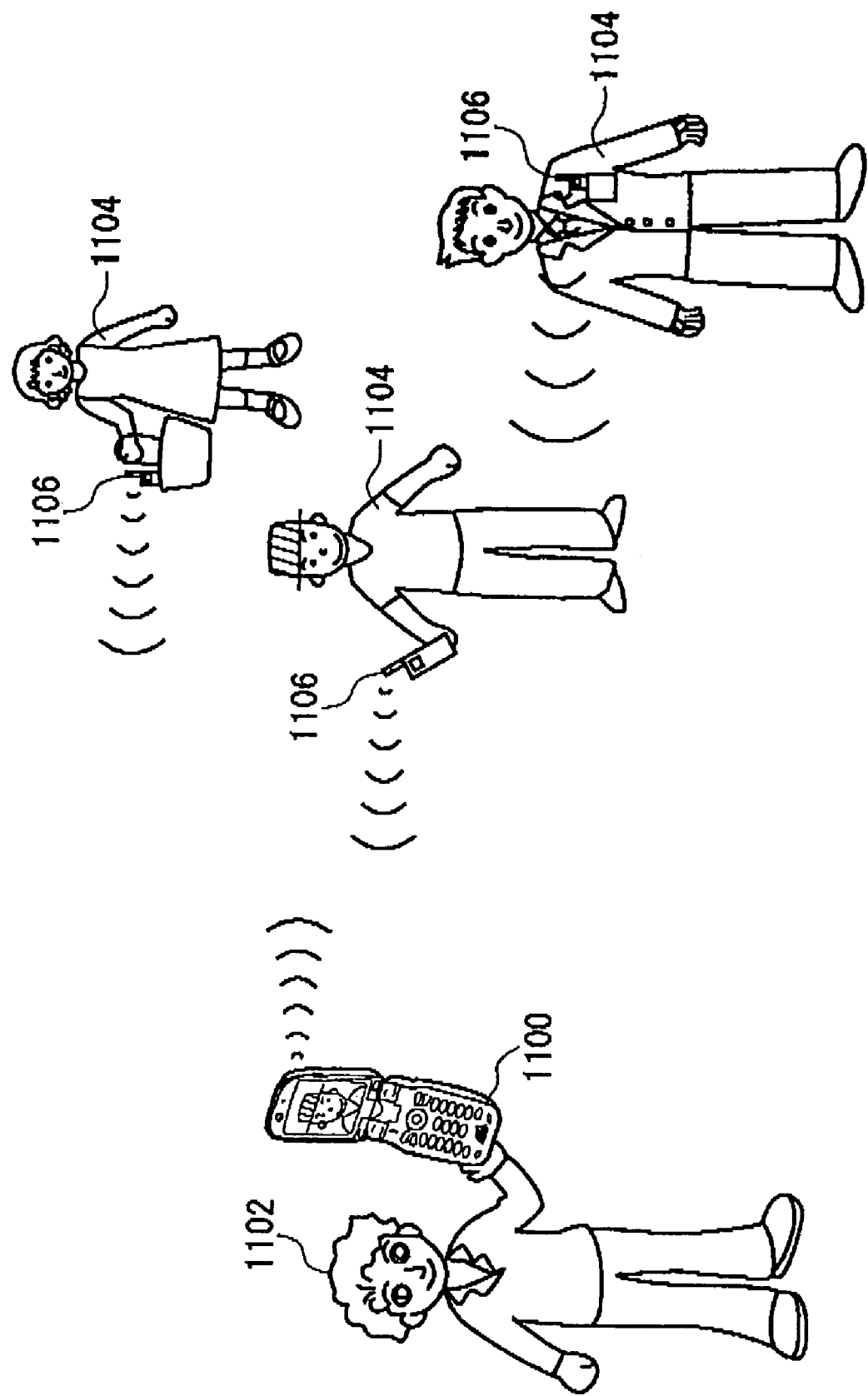
FIG. 11 shows an exemplary environment of usage of a cellular phone 1100.

FIG. 11 shows an exemplary environment of usage of a cellular phone 1100 according to the third embodiment of the present invention. Each of the cellular phones 1100 and 1106 is a cellular phone with a camera and an exemplary imaging device of the present invention. Moreover, each of the cellular phones 1100 and 1106 is an exemplary imaging system of the present invention.

The cellular phone 1100 takes an image of a person that is a subject 1104 based on an instruction from a user 1102. At the same time, the cellular phone 1100 receives an imaging-restriction signal transmitted from the cellular phone 1106 carried by the subject 1104. The imaging-restriction signal may be a radio signal carried by a radio wave or another signal such as an optical signal or an audio signal. The cellular phone 1100 continuously performs imaging to acquire a moving image before and after the cellular phone 1100 takes an image of the subject 1104 based on the user's instruction, and calculates the movement of the cellular phone 1100 with respect to the imaging-restriction signal transmitted from the cellular phone 1106 based on the moving image. The cellular phone 1100 also acquires a change in the field intensity of the imaging-restriction signal transmitted from the cellular phone 1106 before and after taking the image of the subject 1104 based on the user's instruction. Then, the cellular phone 1100 then specifies the subject 1104 that carries the cellular phone 1106 transmitting the imaging-restriction signal based on the change in the field density of the imaging-restriction signal. The cellular phone 1100 restricts the acquisition or use of the image of the specified subject 1104 by performing setting so as to prevent imaging of the specified subject 1104 or prevent distribution of an image in which the specified subject 104 is caught or by saving an image in which the specified subject 1104 is trimmed only.

The cellular phone 1106 may output any of a plurality of types of imaging-restriction signal based on the setting of the user of the cellular phone 1106. For example, in accordance with user's request, the cellular phone 1106 transmits any of an imaging-restriction signal for preventing the imaging by the cellular phone 1100, an imaging-restriction signal for causing a process for obscuring a region of the taken image in which the specified subject 1104 is caught with mosaic or a process for trimming that region, and an imaging-restriction signal for restricting transmission of the taken image. The cellular phone 1106 may restrict the type of image processing to be performed by the cellular phone 1100 in accordance with the type of the imaging-restriction signal that is output. For example, the cellular phone 1106 allows the user to select one of an imaging-restriction signal for prohibiting or reducing the setup, an imaging-restriction signal for prohibiting or reducing correction for a face and an imaging-restriction signal for prohibiting or reducing a process that improves sharpness, and outputs the selected imaging-restriction signal. The cellular phone 1100 may restrict acquisition or use of the image in accordance with the type of the imaging-restriction signal output from the cellular phone 1106. A plurality of imaging-restriction signals of different types may be signals that are different in the signal intensities but are the same in the waveform.

The cellular phone 1106 may output a plurality of imaging-restriction signals of different types that were set in accordance with the closeness between the user of the cellular phone 1106 and the user 1102 of the cellular phone 1100. Then, the cellular phone 1100 may store, for each type of imaging-restriction signal, a type of restricting acquisition or use of the image to be associated with that type of imaging-restriction signal, and may restrict acquisition or use of the image in accordance with the type of the imaging-restriction signal output from the cellular phone 1106. For example, when receiving the imaging-restriction signal that was set for a familiar person, the cellular phone 1100 can take an image of that person with high precision. When receiving the imaging-restriction signal that was set for a person with whom the user of the cellular phone 1100 exchanged information such as the phone number or e-mail address, the cellular phone 1100 can take an image of that person with low or intermediate precision. When receiving the imaging-restriction signal from the cellular phone 1106 of a stranger, the cellular phone 1100 is restricted from acquiring or using an image of that stranger.

According to the cellular phone 1100 of the present embodiment, it is possible to receive the imaging-restriction signal from the cellular phone 1106 carried by a person who does not want to be photographed, so as to restrict acquisition or use of the image of that person. Therefore, it is possible to easily achieve protection of privacy of that person carrying the cellular phone 1106.

Figure 12:
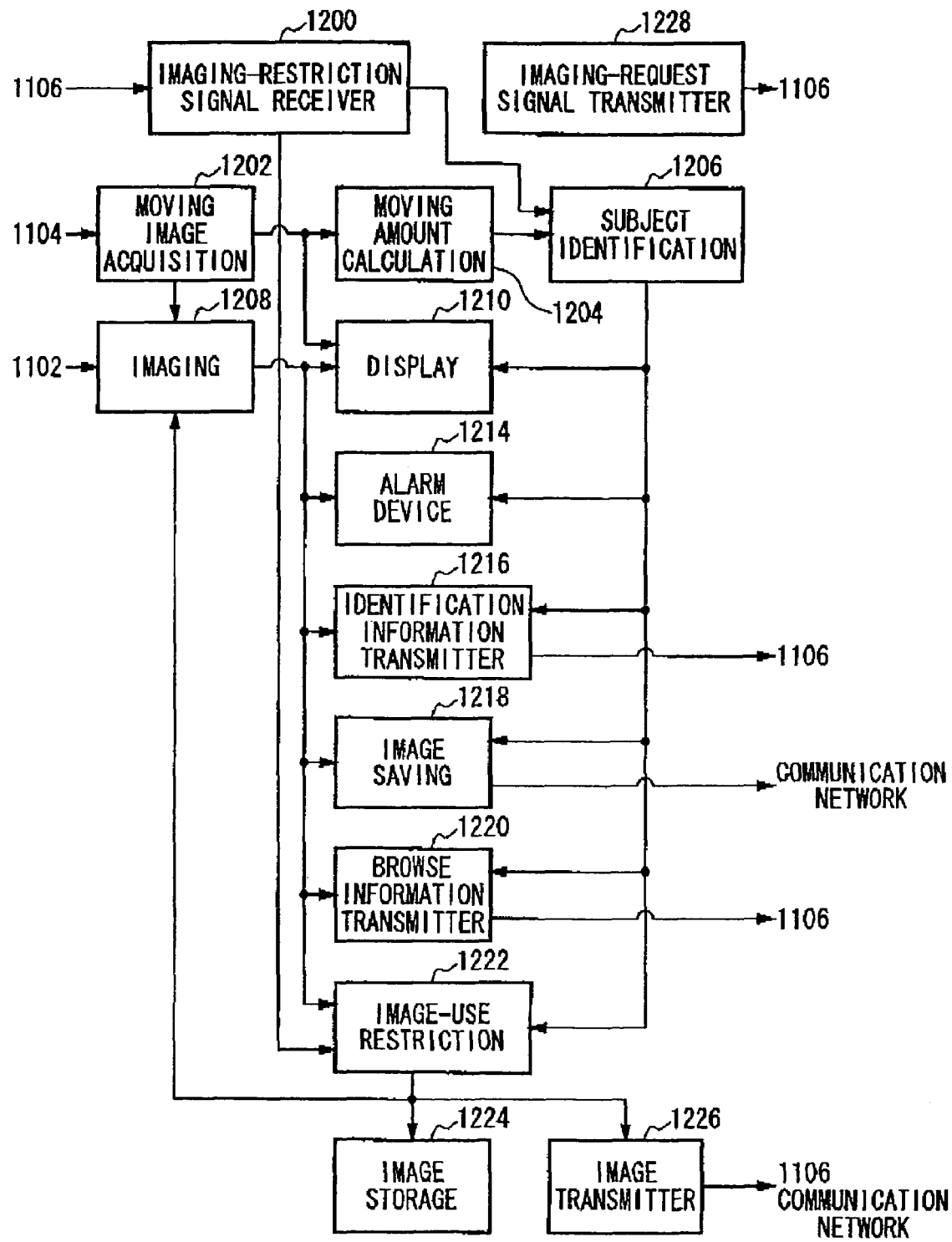
FIG. 12 shows an exemplary structure of the cellular phone 1100.

FIG. 12 shows an exemplary structure of the cellular phone 1100 according to the present embodiment. The cellular phone 1100 includes an imaging-restriction signal receiver 1200, a moving image acquisition unit 1202, a moving amount calculation unit 1204, a subject specifying unit 1206, an imaging unit 1208, a display unit 1210, an alarm device 1214, an identification information transmitter 1216, an image saving unit 1218, a browse information transmitter 1220, an image-use restriction unit 1222, an image storage unit 1224, an image transmitter 1226 and an imaging-request transmitter 1228. The cellular phone 1106 may have the same structure and function as those of the cellular phone 1100.

The moving acquisition unit 1202 continuously images a subject 1104 to acquire a moving image. The imaging-restriction signal receiver 1200 receives an image-restricting signal output from the cellular phone 1106 carried by a person that is the subject 1104. The imaging-restriction signal receiver 1200 is provided at a fixed distance from the moving image acquisition unit 1202, and translates and rotates together with the moving image acquisition unit 1202 in accordance with the movement of the user 1102. It is preferable that the imaging-restriction signal receiver 1200 have directivity in a direction approximately the same as the imaging direction of the moving image acquisition unit 1202. Moreover, in a case where the cellular phone 1102 can output a plurality of imaging-restriction signals of different types, the imaging-restriction signal receiver 1200 specifies the type of the imaging-restriction signal output from the cellular phone 1106 and notifies the image-use restriction unit 222 of the specified type.

The imaging-request transmitter 1228 may transmit an imaging-request signal requesting to acquire or use the image of the subject 1104 who carries the cellular phone 1106. In this case, the cellular phone 1106 outputs the imaging-restriction signal when receiving the imaging-request signal transmitted from the imaging-request signal transmitter 1228. Thus, the imaging-restriction signal receiver 1200 receives the imaging-restriction signal output from the cellular phone 1106 in response to the imaging-restriction signal. The imaging-request signal transmitter 228 may always transmit the imaging-request signal while the cellular phone 1100 is turned on or may transmit it when the user of the cellular phone 1100 instructed the cellular phone 1100 to perform imaging by pressing a release button or the like.

The moving amount calculation unit 1204 calculates the moving amount of the imaging-restriction signal receiver 1200 based on the moving image acquired by the moving image acquisition unit 1202. The subject specifying unit 1206 then specifies the subject 1104 who carries the cellular phone 1106 outputting the imaging-restriction signal the imaging-restriction signal receiver 1200 received, based on the change in the field intensity of that imaging-restriction signal corresponding to the calculated moving amount of the imaging-restriction signal receiver 1200. The imaging unit 1208 accepts an input of the imaging instruction when the user 1102 pressed a release button or the like. Then, the imaging unit 1208 acquires an image when the input of the instruction of the user 1102 was accepted, from the moving image acquired by the moving image acquisition unit 1202.

The image-use restriction unit 1222 restricts acquisition or use of an image in which the subject 1104 specified by the subject specifying unit 1206 is caught. More specifically, the image-use restriction unit 1222 may set a release button so that the release button cannot be pressed down, for example, thereby preventing acceptance of the input of the instruction of the user 1102. Moreover, the image-use restriction unit 1222 may set the cellular phone 1100 so as to prevent transmission of the image in which the specified subject 1104 is caught, thereby preventing transmission of such an image from the image transmitter 1226 to the other cellular phone 1106 or to a communication network such as the Internet. The image-use restriction unit 1222 may prohibit the image storage unit 1224 from storing the image in which the specified subject 1104 is caught. The image-use restriction unit 1222 may store the image in which the specified subject 1104 is caught, after obscuring a region of the subject 1104 in that image with mosaic or trimming that region. In a case where the cellular phone 1106 can output a plurality of imaging-restriction signals of different types, the image-use restriction unit 1222 restricts the acquisition or use of the image in the aforementioned manner in accordance with the type of the imaging-restriction signal informed by the imaging-restriction signal receiver 1200.

Even in a case where the imaging-restriction signal receiver 1200 received the imaging-restriction signal after the imaging unit 1208 took an image, the subject specifying unit 1206 specifies the subject 1104 who carries the cellular phone 1106 outputting that imaging-restriction signal. When the taken image stored in the image storage unit 1224 contains the subject 1104 thus specified by the subject specifying unit 1206, the image-use restriction unit 1222 restricts the use of that taken image. More specifically, the image-use restriction unit 1222 may delete that image in the image storage unit 1224. Alternatively, the image-use restriction unit 1222 may prohibit the transmission of the image stored in the image storage unit 1224, thereby preventing the image transmitter 1226 from transmit that image to the other cellular phone 1106 or a communication network such as the Internet. Alternatively, the image-use restriction unit 1222 may obscure a region of the subject 1104 in the image stored in the image storage unit 1224 with mosaic or trim that region and then save that image after obscured or trimmed by overwriting.

As described above, by calculating the moving amount of the imaging-restriction signal receiver 1200 based on the moving image the moving image acquisition unit 1202 acquired, it is possible to correctly calculate the moving amount of the imaging-restriction signal receiver 1200 even when the user 1102 moved the cellular phone 1100 unintentionally. Thus, the subject specifying unit 1206 can correctly specify the subject 1104 that transmits the imaging-restriction signal. Then, by restricting the acquisition or use of the image in which the specified subject 1104 is caught, privacy of the specified subject 1104 can be protected.

Moreover, the display unit 1210 displays the moving image the moving image acquisition unit 1202 acquired and an image indicating a region of the specified subject 1104 while superimposing those images. Thus, the user 1102 can recognize that there is a person who refuses to be imaged within an angle of view before the user 1102 presses a release button for imaging, and can stop imaging.

When the imaging unit 1208 imaged the subject 1104 specified by the subject specifying unit 1206, the alarm device 1214 makes a warning sound that informs the subject 1104 that the subject 1104 was imaged. Therefore, it is possible to inform a person who refuses to be imaged that the person was imaged, thus preventing the person from being imaged without realizing it.

When the imaging unit 1208 imaged the subject 1104 specified by the subject specifying unit 1206, the identification information transmitter 1216 transmits user identification information for identifying the user 1102 to the cellular phone 1106 carried by a person who is the specified subject 1104. The user identification information is a phone number of the cellular phone 1100 of the user 1102 or e-mail address of the user 1102, for example. In this manner, it is possible to inform a person who refuses to be imaged about who imaged that person. Therefore, it is possible to prevent that person from being imaged without realizing it and to contact that person.

The image saving unit 1218 transmits the image the imaging unit 1208 acquired to an image saving server on a communication network such as the Internet, thereby saving it. Then, the image saving unit 1218 connects to the image saving server and acquires browse information for browsing the saved image. The browse information is address, log-in ID or log-in password of the image saving server, for example. Then, the browse information transmitter 1220 transmits the browse information for browsing the image in which the subject 1104 specified by the subject specifying unit 1206 is caught on the communication network such as the Internet, to the cellular phone 1106 carried by a person who is the specified subject 1104. In this manner, in a case where a person who refuses to be imaged was imaged, that person can browse the taken image by using the received browse information. Thus, it is possible to prevent distribution of an image that person is unaware of.

Figure 13:
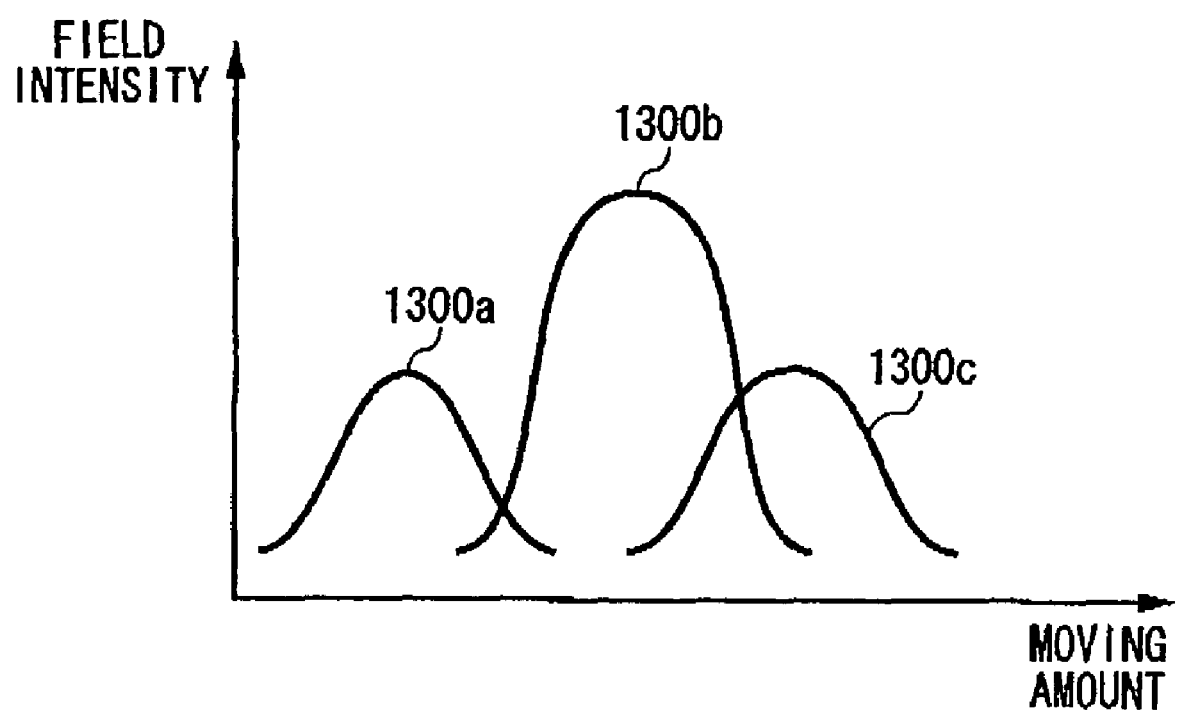
FIG. 13 shows an exemplary relationship between the moving amount and the field intensity.

FIG. 13 shows an exemplary relationship between the moving amount of the imaging-restriction signal receiver 1200 and the field intensity the imaging-restriction signal receiver 1200 receives in the present embodiment. The horizontal axis represents the moving amount of the imaging-restriction signal receiver 1200 calculated by the moving amount calculation unit 1204 based on the moving image acquired by the moving image acquisition unit 1202. The vertical axis represents the field intensity of each of a plurality of imaging-restriction signals 1300a, 1300b and 1300c the imaging-restriction signal receiver 1200 received. The image-restriction signals 1300a, 1300b and 1300c are output from a plurality of cellular phone 1106 carried by a plurality of subjects 1104, respectively. As shown in FIG. 13, when the imaging-restriction signal receiver 1200 moves, the field intensities of the imaging-restriction signals 1300a, 1300b and 1300c received by the imaging-restriction signal receiver 1200 change. Thus, even in a case where a plurality of cellular phones 1106 respectively carried by a plurality of subjects 1104 exist close, because the moving acquisition unit 202 continuously performs imaging to acquire a moving image while the imaging-restriction signal receiver 1200 continuously receives the imaging-restriction signals 1300a, 1300b and 1300c, the subject specifying unit 1206 can correctly specify the respective subjects 1104 based on the changes in the field intensities of the imaging-restriction signals 1300a, 1300b and 1300c output from the respective cellular phones 1106.

Figure 14:
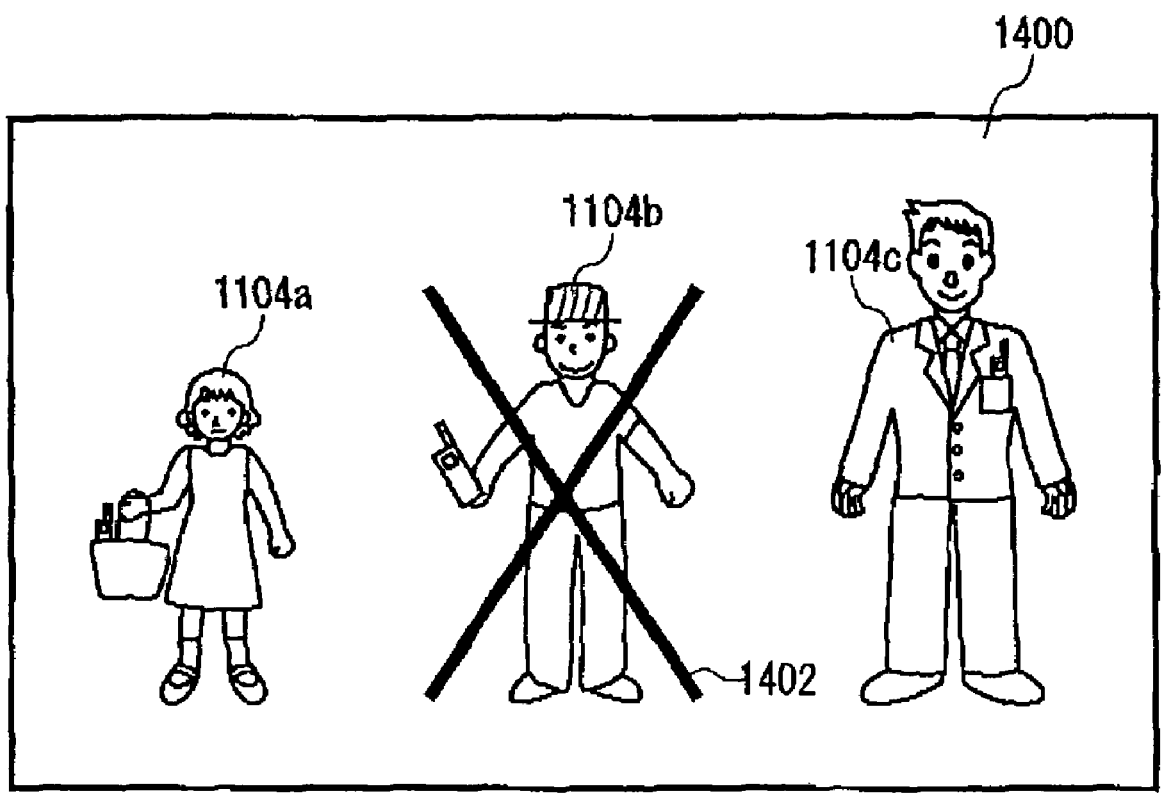
FIG. 14 shows an exemplary display screen of a display unit 1210.

FIG. 14 shows an exemplary display screen of the display unit 1210 of the present embodiment. The display unit 1210 is an LCD finder such as a liquid crystal monitor. The display unit 1210 displays a moving image 1400 acquired by the moving image acquisition unit 1202 and a refusal image 1402 indicating a region of a subject 1104b specified by the subject specifying unit 1206 while superimposing those images 1400 and 1402. For example, in a case where a cellular phone 1106 the subject 1104b carries outputs an imaging-restriction signal and subjects 1104a and 1104c do not refuse to be imaged, the display unit 1210 displays "x" as an image indicating the region of the subject 1104b on the subject 1104b, as shown in FIG. 14. Since it is displayed on the LCD finder that the subject 1104b who refuses to be imaged exists in the angle of view of the cellular phone 1100 in this manner, the user 1102 of the cellular phone 1100 can perform imaging after moving to a position where the user 1102 can take an image in which the subject 1104b is not caught.

Figure 15A:
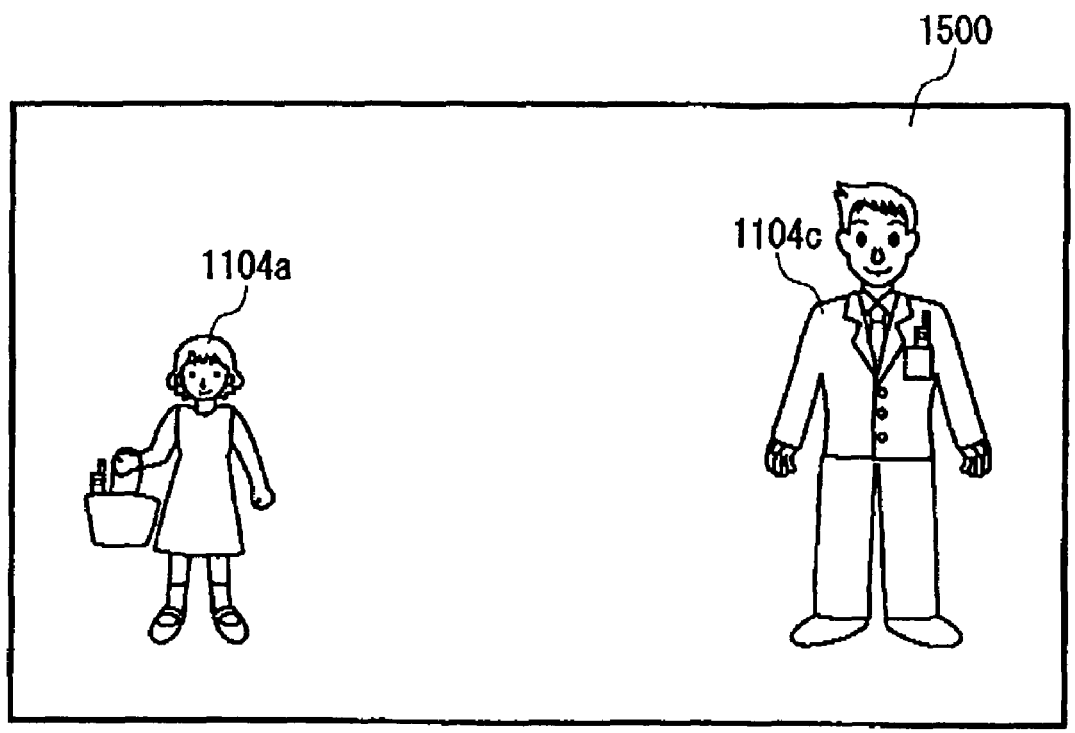
FIGS. 15A and 15B show examples of an image, the use of which is restricted.
Figure 15B:
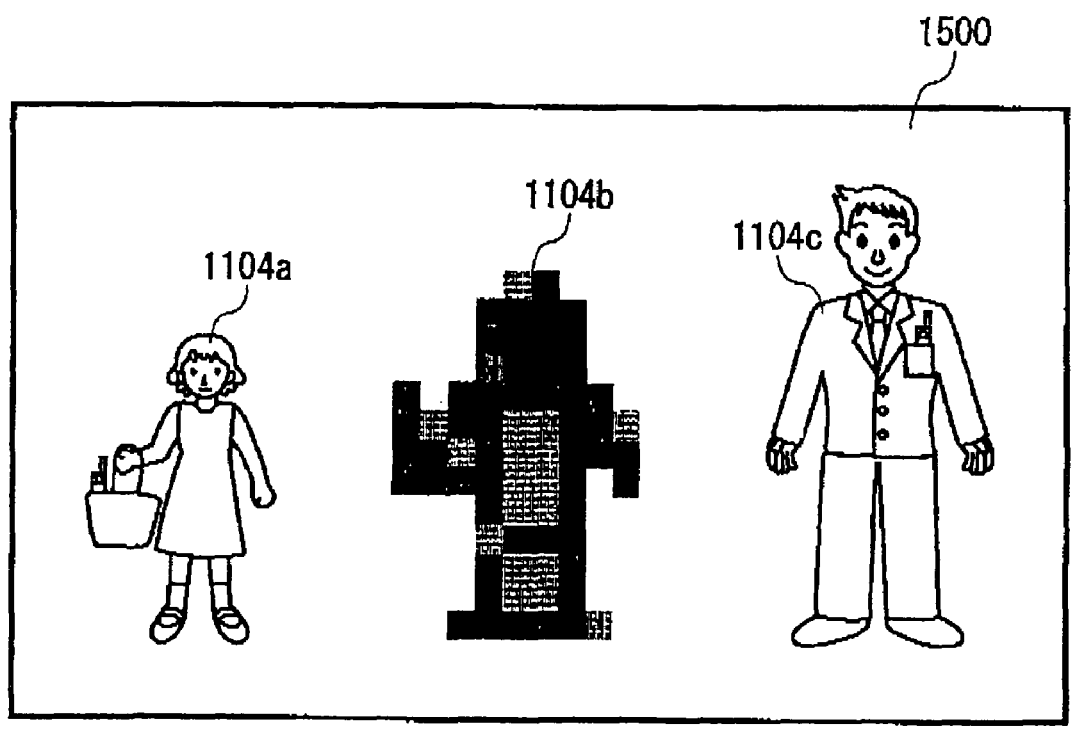

FIGS. 15A and 15B show examples of an image 1500 for which the image-use restriction unit 1222 of the present embodiment restricted the use. FIG. 15A shows the image 1500 in which the region of the subject 1104 that was specified by the subject specifying unit 1206 was trimmed by the image-use restriction unit 1222. FIG. 15B shows the image 1500 in which the region of the specified subject 1104 was obscured with mosaic by the image-use restriction unit 1222.

The image-use restriction unit 1222 determines a region including points near the specified subject 1104 which are at approximately the same distance from the cellular phone 1100 as the region of the subject 1104 who refuses to be imaged, and then trims the determined region or obscures that region with mosaic. For example, in a case where the cellular phone 116 carried by the subject 1104b outputs an imaging-restriction signal and the subjects 1104a and 1104c do not refuse to be imaged, the image-use restriction unit 1222 trims the region of the subject 1104b or obscures it with mosaic, as shown in FIGS. 15A and 15B. Thus, it is possible to protect the privacy of the subject 1104b who refuses to be imaged.

Figure 16:
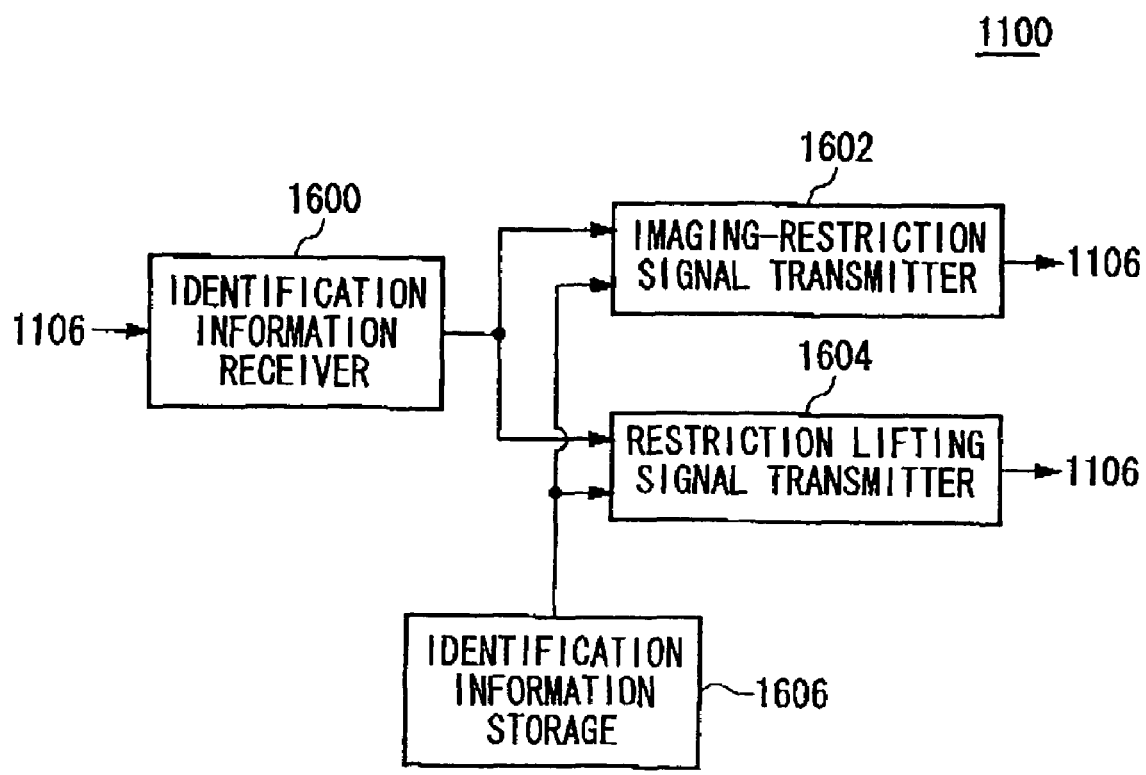
FIG. 16 shows another exemplary structure of the cellular phone 1100.

FIG. 16 shows another exemplary structure of the cellular phone 1100 of the present embodiment. The cellular phone 1100 includes the components shown in FIG. 11 and further includes an identification information receiver 1600, an imaging-restriction signal transmitter 1602, a restriction lifting signal transmitter 1604 and an identification information storage unit 1606. In other words, the cellular phone 1100 of this example may receive an imaging-restriction signal from another cellular phone 1106 to restrict acquisition or use of an image as described referring to FIGS. 11–15B, and may transmit an imaging-restriction signal to the other cellular phone 1106.

The imaging-restriction signal transmitter 1602 of the cellular phone 1100 transmits an imaging-restriction signal for restricting acquisition or use of an image of the user 1102 of the cellular phone 1100 to the other cellular phone 1106. The identification information receiver 1600 then receives, from the other cellular phone 1106 that images the user 1102, user identification information for identifying the user of the cellular phone 1106. The user identification information is a phone number of the cellular phone 1106 carried by the user identified by that user identification information or e-mail address of that user. Then, in a case where the identification information receiver 1600 received the user identification information, the restriction lifting signal transmitter 1604 transmits a restriction lifting signal that lifts the restriction on the acquisition or use of the image containing the user 1102 as the subject to the cellular phone 1106 carried by the user identified by the thus received user identification information. In this manner, it is possible to allow only a person who informed the user 1102 about who that person is to image the user 1102 and restrict a person who did not inform the user 1102 about who that person is from imaging.

The identification information storage unit 1606 may store user identification information of a user who is not restricted to acquire or use an image containing the user 1102 as the subject. Moreover, when the user identification information received by the identification information receiver 1600 is stored in the identification information storage unit 1606, the restriction lifting signal transmitter 1604 may transmit the restriction lifting signal to the other cellular phone 1106. In addition, the identification storage unit 1606 may store an address book or a call history of the cellular phone 1100, for example, and the restriction lifting signal transmitter 1604 may transmit the restriction lifting signal to the other cellular phone 1106 only when the phone number or e-mail address the identification information receiver 1600 received as the user identification information is on the address book or call history stored in the identification information storage unit 1606. In this manner, it is possible to allow only a person who is on the address book or call history, i.e., a person whom the user 1102 knows and restrict a person who is a stranger to the user 1102.

In an alternative example, the identification information receiver 1600 receives not only an imaging-request signal requesting to acquire or use of an image containing the user 1102 carrying the cellular phone 1100 as the subject but also user identification information of another user who carries another cellular phone 1106 transmitting the above imaging-request signal from the other cellular phone 1106. Then, in a case where the user identification information received by the identification information receiver 1600 is not stored in the identification information storage unit 1606, the imaging-restriction signal transmitter 1602 transmits an imaging-restriction signal that restricts the acquisition or use of the image containing the user 1102 as the subject to the cellular phone 1106. In other words, in this example, the cellular phone 1106 automatically outputs the imaging-request signal when the user input the imaging instruction. Then, the imaging-restriction signal transmitter 1602 of the cellular phone 1100 transmits the imaging-restriction signal only in a case where it always output no imaging-restriction signal and the identification information receiver 1600 received the imaging-request signal. Thus, unnecessary power consumption can be reduced.

In the present embodiment, the cellular phone 1100 is allowed to acquire or use an image of a subject 1104 in a default state, and, when receiving an imaging-restriction signal, the cellular phone 1100 is restricted from acquiring or using an image of a subject 1104 who carries a cellular phone 1106 output an imaging-restriction signal. Alternatively, the cellular phone 1100 may be restricted from acquiring or use the image of the subject 1104 in a default state, and may be allowed to acquire or use the image of the subject 1104 who carries the cellular phone 1106 that output an image-permission signal, when receiving that image-permission signal.

Figure 17:
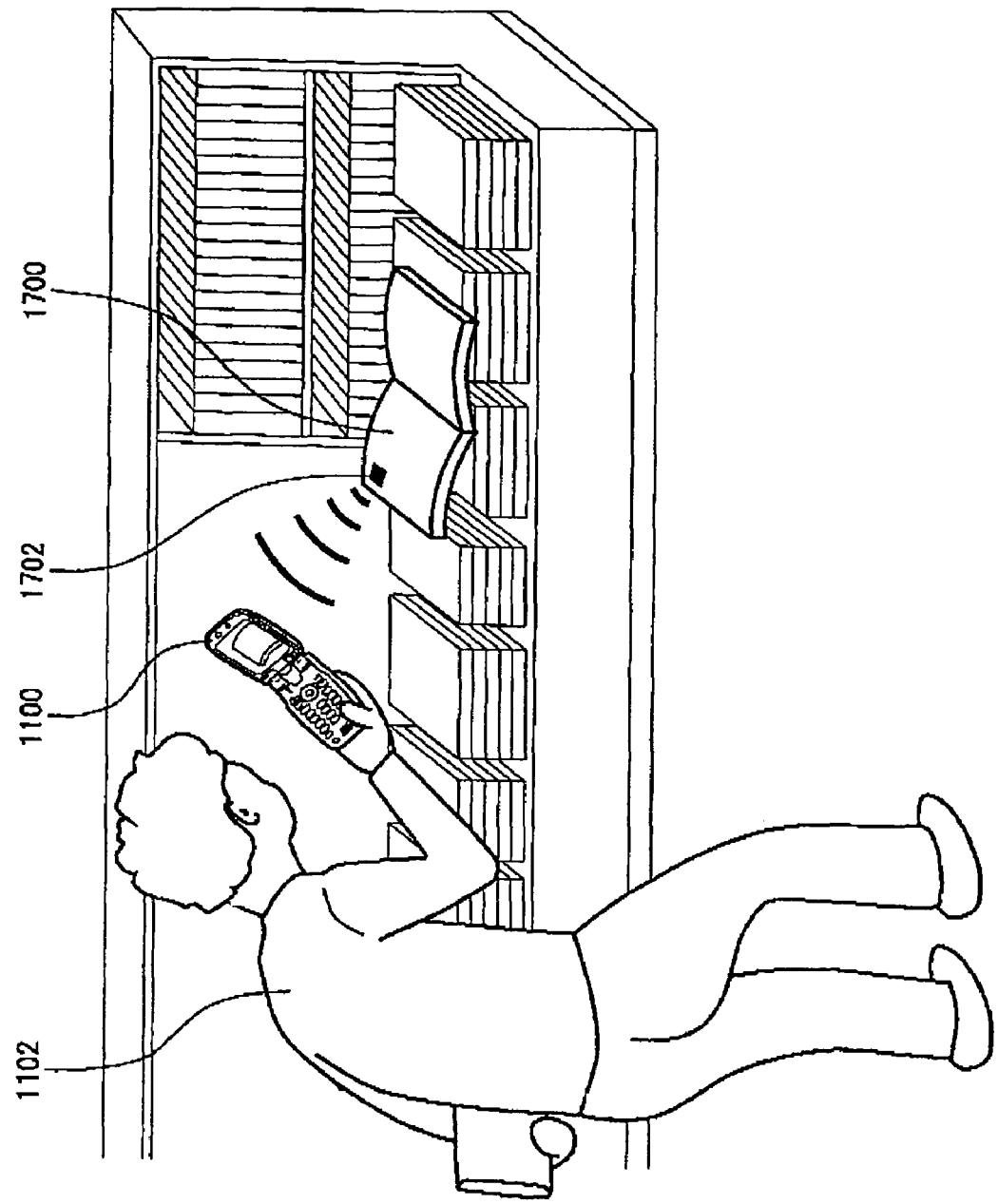
FIG. 17 shows another exemplary environment of usage of the cellular phone 1100.

FIG. 17 illustrates another exemplary environment of usage of the cellular phone 1100 according to the present embodiment. The cellular phone 1100 described referring to FIGS. 11–16 receives the imaging-restriction signal from the cellular phone 1106 and restricts the acquisition or use of an image containing the subject 1104 carrying the cellular phone 1106. However, the cellular phone 1100 may receive an imaging-restriction signal from a transmitter 1702 attached to a book 1700 as an exemplary subject of the present invention so as to restrict the acquisition or use of an image of the book 1700. The transmitter 1702 is an RF tag that operates by using a radio wave supplied from the outside as a power source, for example. Except for the following, the cellular phone 1100 shown in FIG. 17 has the same structure and function as those of the cellular phone 1100 described referring to FIGS. 11–16. Thus, the description of the cellular phone 1100 shown in FIG. 17 is partially omitted.

The moving image acquisition unit 1202 continuously images the book 1700 so as to acquire a moving image. The imaging-restriction signal receiver 1200 receives an imaging-restriction signal output from the transmitter 1702 attached to the book 1700. The moving amount calculation unit 1204 then calculates the moving amount of the imaging-restriction signal receiver 1200 based on the moving image the moving image acquisition unit 1202 acquired. Then, the subject specifying unit 1206 specifies the book 1700 to which the transmitter 1702 outputting the received imaging-restriction signal is attached, based on the change in the field intensity of the received imaging-restriction signal corresponding to the moving amount of the imaging-restriction signal receiver 1200 calculated by the moving amount calculation unit 1204. Moreover, the imaging unit 1208 acquires an image from the moving image acquired by the moving image acquisition unit 1202. The image is an image when an input of an instruction from the user 1102 was accepted. The image-use restriction unit 1222 restricts acquisition or use of the image containing the book 17000 that is the subject specified by the subject specifying unit 1206.

The image-use restriction unit 1222 may restrict the acquisition or use of the image containing the book 1700 in a case where the field intensity of the imaging-restriction signal output from the transmitter 1702 attached to the book 1700 exceeds a predetermined value. In this manner, in a case where the cellular phone 1100 images the book 1700 in a macro mode near the book 1700, it is possible to restrict the acquisition or use of the image from which the contents of the book 1700 can be read. In this example, an example is described in which the transmitter 1702 is attached to the book 1700 so as to restrict the acquisition or use of the image of the book 1700. Moreover, such a transmitter may be attached to a work of art that belongs in a museum or the like, thereby restricting acquisition or use of an image of that work of art.

Figure 18:
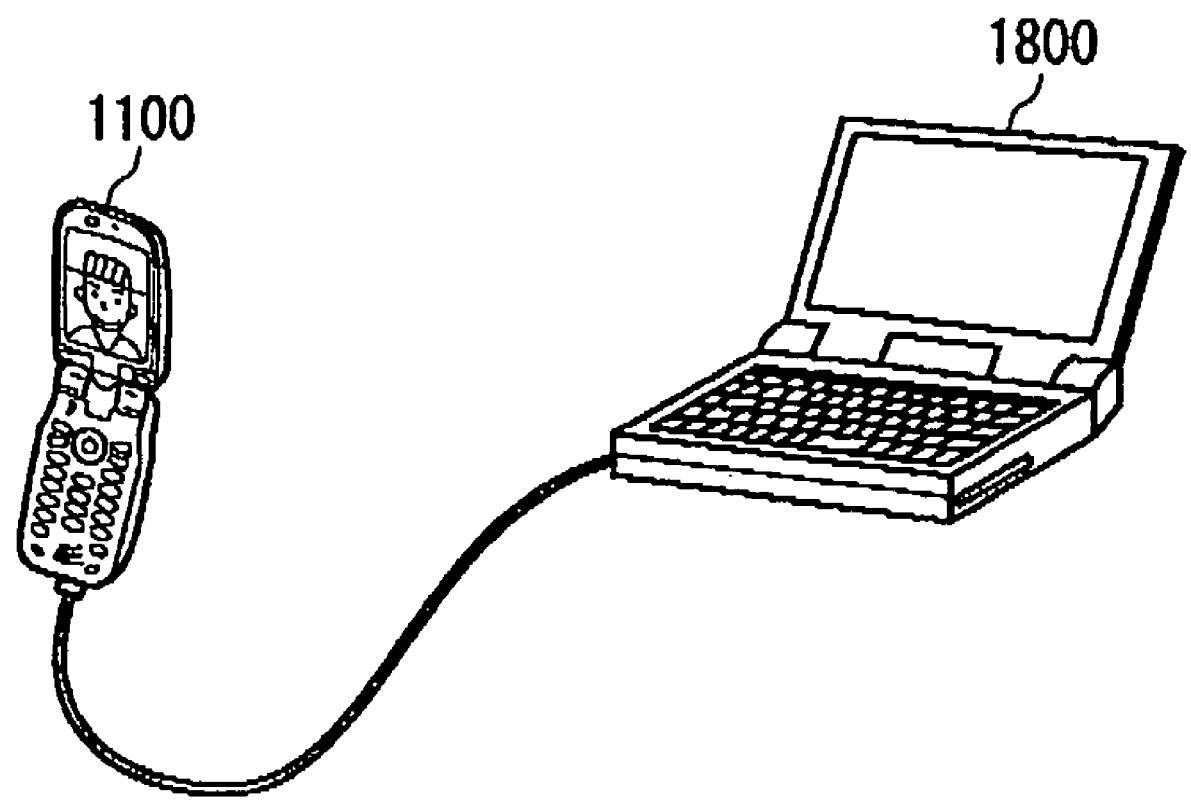
FIG. 18 shows another exemplary environment of usage of the cellular phone 1100.

FIG. 18 shows another exemplary environment of the cellular phone 1100 according to the present embodiment. The cellular phone 1100 described referring to FIGS. 11–16 receives the imaging-restriction signal from the cellular phone 1106 and restricts the acquisition or use of the image containing the subject 1104 who carries the cellular phone 1106. However, the cellular phone 1100 may specify the subject 1104 who carries the cellular phone 1106 and store the subject 1104 and the image thereof to be associated with each other. In this case, an output device 1800 for outputting the image may refer to the subject 1104 that is stored to be associated with the image, thereby restricting the use of that image. Except for the following, the cellular phone 1100 of this example has the same structure and function as those of the cellular phone 1100 described referring to FIGS. 11–16. Therefore, the description of the cellular phone 1100 of this example is partially omitted.

The moving image acquisition unit 1202 acquires a moving image by continuously imaging the subject 1104. The imaging-restriction signal receiver 1200 receives an imaging-restriction signal output from the cellular phone 1106 carried by the subject 1104. The moving amount calculation unit 1202 calculates the moving amount of the imaging-restriction signal receiver 1200 based on the moving image acquired by the moving image acquisition unit 1202. Then, the subject specifying unit 1206 specifies the subject 1104 who carries the cellular phone 1106 outputting the received imaging-restriction signal based on the change in the field intensity of the received imaging-restriction signal corresponding to the moving amount of the imaging-restriction signal receiver 1200. The imaging unit 1208 acquires an image from the moving image acquired by the moving image acquisition unit 1202. That image is an image when an input of an instruction from the user 1102 was accepted. Then, the image storage unit 1224 stores the subject 1104 that was specified by the subject specifying unit 1206 and the image acquired by the imaging unit 1208 so as to be associated with each other.

The output device 1800 is a display device of a personal computer or a television set, or a printing device such as a printer or a laboratory. The output device 1800 acquires the image taken by the cellular phone 1100 via a communication cable, memory or communication network, and restricts the use of the image containing the subject 1104 that was specified by the subject specifying unit 1206. More specifically, the output device 1800 may prohibit the transmission of the image that is associated with the subject 1104 the subject specifying unit 1206 specified. The output device 1800 may prohibit the image associated with the subject 1104 specified by the subject specifying unit 1206 from being stored. The output device 1800 may display or print a region of the specified subject 1104 in the image associated with the specified subject 1104 after obscuring that region with mosaic or trimming that region. In this manner, when the output device 1800 that is provided in the outside of the cellular phone 1100 controls restriction of the use of the image, the function of the cellular phone 1100 can be reduced. This contributes to increase of an imaging speed of the cellular phone 1100 and side reduction of the cellular phone 1100.

Although the present invention has been described by way of exemplary embodiments, it should be understood that those skilled in the art might make many changes and substitutions without departing from the spirit and the scope of the present invention which is defined only by the appended claims.

What is claimed is:

1. An imaging device for receiving a radio signal output from an RF tag attached to a subject to acquire identification information of said subject, comprising: an imaging unit operable to continuously image a plurality of subjects to acquire a moving image; a radio receiver operable to receive a plurality of radio signals respectively output from RF tags attached to said plurality of subjects to acquire a plurality of units of subject identification information respectively indicated by said plurality of radio signals, said subject identification information being information for identifying a corresponding one of said subjects, said radio receiver moving together with said imaging unit and having directivity in a direction approximately the same as an imaging direction of said imaging unit; a moving amount calculation unit operable to calculate a moving amount of said radio receiver based on said moving image acquired by said imaging unit; and a subject direction specifying unit operable to specify directions of said plurality of subjects that are identified by said plurality of units of subject identification information acquired by said radio receiver based on changes in field intensities of said plurality of radio signals received by said radio receiver, respectively, said changes corresponding to said moving amount of said radio receiver calculated by said moving amount calculation unit.

2. An imaging device as claimed in claim 1, further comprising: a selecting instruction acquisition unit operable to acquire a selecting instruction from a user while said imaging unit continuously images said plurality of subjects to acquire said moving image; a subject image extraction unit operable to extract a subject image that is an image when said selecting instruction acquisition unit acquired said selecting instruction, from said moving image; and an image storage unit operable to store subject identification information said radio receiver acquired from a direction of a subject contained in said extracted subject image to be associated with said extracted subject image.

3. An imaging device as claimed in claim 2, further comprising: a subject image acquisition unit operable to, in a case where said radio receiver acquired two or more units of subject identification information from said direction of said subject contained in said extracted subject image, acquire subject images respectively identified by said two or more units of subject identification information from a server; and a subject image selection unit operable to select one of said two or more subject images acquired by said subject image acquisition unit, that is similar to said subject image extracted by said subject image extraction unit, wherein said image storage unit stores one unit of said two or more subject identification information received by said radio receiver, that identifies said subject image selected by said subject image selection unit, to be associated with said subject image extracted by said subject image extraction unit.

4. An imaging device as claimed in claim 2, further comprising: a subject type acquisition unit operable to, in a case where said radio receiver acquired two or more units of subject identification information from said direction of said subject contained in said extracted subject image, acquire two or more subject types respectively identified by said two or more units of subject identification information from a server; and a subject type selection unit operable to specify a site in a human body as said subject contained in said subject image extracted by said subject image extraction unit and to select one of said two or more subject types said subject type acquisition unit acquired based on said specified site, wherein said image storage unit stores one of said two or more units of subject identification information said radio receiver acquired, that identifies said one subject type selected by said subject type selection unit, to be associated with said subject image extracted by said subject image extraction unit.

5. An imaging device as claimed in claim 2, further comprising: a subject information acquisition unit operable to acquire subject information identified by said subject identification information that is stored by said image storage unit to be associated with said subject image, from a server; and a display unit operable to display said subject information acquired by said subject information acquisition unit.

6. An imaging device as claimed in claim 5, wherein, in a case where said radio receiver acquired two or more units of subject identification information from said direction of said subject contained in said extracted subject image, said image storage unit stores said two or more units of subject identification information acquired by said radio receiver from said direction of said subject contained in said extracted subject image, to be associated with said subject image extracted by said subject image extraction unit, said subject information acquisition unit acquires basic information from said server for each of two or more subjects respectively identified by said two or more units of subject identification information stored by said image storage unit, said basic information being simpler than said subject information, and said display unit displays two or more units of basic information acquired by said subject information acquisition unit to make said user select one of said two or more units of basic information, and displays subject information of a subject corresponding to said selected basic information.

7. An imaging device as claimed in claim 1, wherein, in a case where said radio receiver receives said plurality of radio signals at the same time, said radio receiver enhances said directivity of receiving said radio signals, and said imaging unit makes its angle of view narrower in accordance with a change of said directivity of said radio receiver.

8. An information storage server for storing information acquired from an imaging device including: an imaging unit for continuously imaging a plurality of subjects to acquire a moving image; and a radio receiver for receiving a plurality of radio signals respectively output from RF tags attached to said plurality of subjects to acquire a plurality of units of subject identification information respectively indicated by said plurality of radio signals, said subject identification information being information for identifying a corresponding one of said subjects, said radio receiver moving together with said imaging unit and having a directivity in a direction approximately the same as an imaging direction of said imaging unit, said information storage server comprising: a field intensity acquisition unit operable to acquire changes in field intensities of said plurality of radio signals received by said radio receiver; an identification information acquisition unit operable to acquire said plurality of units of subject identification information acquired by said radio receiver; a moving image acquisition unit operable to acquire said moving image acquired by said imaging unit; a moving amount calculation unit operable to calculate a moving amount of said radio receiver based on said moving image acquired by said moving image acquired unit; and a subject direction specifying unit operable to specify directions of said plurality of subjects respectively identified by said plurality of units of subject identification information with respect to said imaging device, based on said changes in said field intensities of said plurality of radio signals received by said field intensity acquisition unit, said changes corresponding to said calculated moving amount of said radio receiver.

9. An information storage server as claimed in claim 8, wherein said subject identification information contains item identification information for identifying an item that is said corresponding one subject and owner identification information for identifying said item, and said information storage server further comprises: an item information storage unit operable to store item information that is information on said item identified by said item identification information to be associated with said item identification information; an item information request receiver operable to obtain a transmission request for said item information by receiving said subject identification information from said imaging device; an item information transmitter operable to transmit said item information associated with said item identification information contained in said subject identification information received by said item information request receiver, to said imaging device; and a point counter operable to increase the number of points accumulated in order to provide an item or service to said owner identified by said owner identification information contained in said subject identification information received by said item information request receiver, to be associated with said owner identification information.

10. An information storage server as claimed in claim 9, wherein said point counter increases said number of points in a case where a user of said imaging device bought said item after browsing said item information.

11. An article identification apparatus for receiving a radio signal output from an RF tag attached to an article to acquire information on said article and identify said article, comprising:
- a radio receiver operable to receive a plurality of radio signals respectively output from RF tags attached to a plurality of articles and acquire a plurality of units of article information respectively indicated by said plurality of radio signals, said article information being information on a corresponding one of said plurality of articles;
- an article position specifying unit operable to specify positions of said plurality of articles based on changes in field intensities of said plurality of radio signals received by said radio receiver;
- an article information storage unit operable to store said plurality of units of article information acquired by said radio receiver and said positions of said articles specified by said article position specifying unit to be associated with each other, and
- an imaging unit operable to continuously image said plurality of articles to acquire a moving image; and a moving amount calculation unit operable to calculate moving amounts of said articles based on said moving image acquired by said imaging unit, wherein said article position specifying unit specifies said positions of said plurality of articles based on said changes in said field intensities of said plurality of radio signals received by said radio receiver, corresponding to said moving amounts of said articles calculated by said moving amount calculation unit.

12. An article identification apparatus as claimed in claim 11, wherein said article information is information indicating a place into which said corresponding article is sorted, and said article identification apparatus further comprises a sorting unit operable to sort an article existing on a position that is stored in said item information storage unit to be associated with said item information, based on said item information.

13. An article identification apparatus as claimed in claim 11, wherein said article information is information indicating a predetermined mark or label to be attached to said corresponding article, and said article identification apparatus further comprises a marking unit operable to attach a predetermined mark or label to an article placed on a position that is stored in said item information storage unit to be associated with said item information, based on said item information.

14. An imaging device for imaging a subject, comprising: a moving image acquisition unit operable to continuously image said subject to acquire a moving image; an imaging-restriction signal receiver operable to receive an imaging-restriction signal output from a transmitter attached to said subject, said imaging-restriction signal moving together with said moving image acquisition unit and having directivity in a direction approximately the same as an imaging direction of said moving image acquisition unit; a moving amount calculation unit operable to calculate a moving amount of said imaging-restriction signal receiver based on said moving image; a subject specifying unit operable to specify said subject to which said transmitter outputting said received imaging-restriction signal is attached based on a change in a field intensity of said received imaging-restriction signal, said change corresponding to said calculated moving amount of said imaging-restriction signal receiver; an imaging unit operable to acquire an image when an input of an instruction, from a user was accepted, from said moving image; and an image-use restriction unit operable to restrict acquisition or use of said image containing said specified subject.

15. An imaging device as claimed in claim 14, wherein said image-use restriction unit performs setting to prevent said imaging unit from accepting said input of said instruction from said user.

16. An imaging device as claimed in claim 14, wherein said image-use restriction unit performs setting to prevent transmission of said image containing said subject specified by said subject specifying unit.

17. An imaging device as claimed in claim 14, wherein said image-use restriction unit stores said image containing said subject specified by said subject specifying unit after obscuring a region of said subject in said image with mosaic or trimming said region.

18. An imaging device as claimed in claim 14, further comprising a display unit operable to display said moving image acquired by said moving image acquisition unit and an image indicating a region of said subject specified by said subject specifying unit while superimposing said moving image and said image indicating said region of said subject.

19. An imaging device as claimed in claim 14, further comprising an alarm device operable to make an alarm sound when said imaging unit imaged said subject specified by said subject specifying unit.

20. An imaging device as claimed in claim 14, wherein said transmitter is a cellular phone carried by a person who is said subject, and said imaging-restriction signal receiver receives said imaging-restriction signal output from said cellular phone.

21. An imaging device as claimed in claim 20, further comprising an identification information transmitter operable to transmit user identification information to said cellular phone when said imaging unit imaged said subject specified by said subject specifying unit, said user identification information being information for identifying said user.

22. An imaging device as claimed in claim 20, further comprising: an image saving unit operable to save said image acquired by said imaging unit in an image server on the Internet; and a browse information transmitter operable to transmit browse information to said cellular phone, said browse information being information for browsing said image containing said subject specified by said subject specifying unit on the Internet.

23. An imaging device as claimed in claim 14, wherein said transmitter outputs any of a plurality of imaging-restriction signals of different types, and said image-use restriction unit restricts acquisition or use of said image in accordance with a type of said imaging-restriction signal output from said transmitter.

24. An imaging device as claimed in claim 14, further comprising an imaging-restriction signal transmitter operable to transmit an imaging-restriction signal for restricting acquisition or use of an image of said user carrying said imaging device to another imaging device; an identification information receiver operable to receive user identification information from said another imaging device that images said user, said user identification information being information for identifying another user who carries said another imaging device; and a restriction lifting signal transmitter operable to transmit a restriction lifting signal for lifting restriction of acquisition or use of said image to said another imaging device when said identification information receiver received said user identification information.

25. An imaging device as claimed in claim 24, further comprising an identification storage unit operable to store said user identification information of said another user who is not restricted from acquiring or using said image of said user, wherein said restriction lifting signal transmitter transmits said restriction lifting signal to said another imaging device in a case where said user identification information said identification information receiver received is stored in said identification information storage unit.

26. An imaging device as claimed in claim 14, further comprising: an identification information receiver operable to receive an imaging-request signal requesting acquisition or use of an image of said user who carries said imaging device, as well as user identification information that is information for identifying another user who carries another imaging device transmitting said imaging-request signal, from said another imaging device; an identification information storage unit operable to store said user identification information for said another user who is not restricted from acquiring or using said image of said user; and an imaging-restriction signal transmitter operable to transmit an imaging-restriction signal for restricting acquisition or use of said image of said user in a case where said identification information storage unit does not store said user identification information received by said identification information receiver.

27. An imaging device as claimed in claim 14, wherein said transmitter is attached to a book, and said image-use restriction unit restricts acquisition or use of said image containing said book as said subject specified by said subject specifying unit.

28. An imaging device as claimed in claim 27, wherein said image-use restriction unit restricts acquisition or use of said image containing said book when an field intensity of said imaging-restriction signal output from said transmitter exceeds a predetermined value.

29. An imaging system comprising: an imaging device operable to image a subject; and a transmitter, attached to said subject, operable to transmit an imaging-restriction signal, wherein said imaging device includes: a moving image acquisition unit operable to acquire a moving image by continuously imaging said subject; an imaging-request signal transmitter operable to transmit an imaging-request signal requesting acquisition or use of an image of said subject to which said transmitter is attached; an imaging-restriction signal receiver operable to receive said imaging-restriction signal output from said transmitter, said imaging-restriction signal receiver moving together with said moving image acquisition unit and having directivity in a direction approximately the same as an imaging direction of said moving image acquisition unit; a moving amount calculation unit operable to calculate a moving amount of said imaging-restriction signal receiver based on said moving image acquired by said moving image acquisition unit; a subject specifying unit operable to specify said subject to which said transmitter outputting said received imaging-restriction signal is attached based on a change in a field intensity of said received imaging-restriction signal, said change corresponding to said calculated moving amount of said imaging-restriction signal receiver; an imaging unit operable to acquire an image when an input of an instruction from a user was accepted, from said moving image; and an image-use restriction unit operable to restrict acquisition or use of said image containing said subject specified by said subject specifying unit, and said transmitter transmits said imaging-restriction signal to said imaging device when receiving said imaging-request signal.

30. An imaging system comprising: an imaging device operable to image a subject; and an output device operable to output an image taken by said imaging device, wherein said imaging device includes: a moving image acquisition unit operable to acquire a moving image by continuously imaging said subject; an imaging-restriction signal receiver operable to receive an imaging-restriction signal output from a transmitter attached to said subject, said imaging-restriction signal receiver moving together with said moving image acquisition unit and having directivity in a direction approximately the same as an imaging direction of said moving image acquisition unit; a moving amount calculation unit operable to calculate a moving amount of said imaging-restriction signal receiver based on said moving image acquired by said moving image acquisition unit; a subject specifying unit operable to specify said subject to which said transmitter outputting said received imaging-restriction signal is attached based on a change in a field intensity of said received imaging-restriction signal, said change corresponding to said calculated moving amount of said imaging-restriction signal receiver; an imaging unit operable to acquire an image when an input of an instruction from a user was accepted, from said moving image; and an image storage unit operable to store said subject specified by said subject specifying unit and said image to be associated with each other, and said output device restricts use of said image containing said subject specified by said subject specifying unit.

* * * * *